(12) United States Patent
Melchior

(10) Patent No.: US 12,476,432 B2
(45) Date of Patent: Nov. 18, 2025

(54) DIRECTED GAS PURGE TO REDUCE DUSTING OF EXCIMER DISCHARGE CHAMBER WINDOWS

(71) Applicant: Cymer, LLC, San Diego, CA (US)

(72) Inventor: John Theodore Melchior, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 755 days.

(21) Appl. No.: 17/783,026

(22) PCT Filed: Dec. 9, 2020

(86) PCT No.: PCT/US2020/064124
§ 371 (c)(1),
(2) Date: Jun. 7, 2022

(87) PCT Pub. No.: WO2021/126641
PCT Pub. Date: Jun. 24, 2021

(65) Prior Publication Data
US 2023/0006409 A1    Jan. 5, 2023

Related U.S. Application Data

(60) Provisional application No. 62/951,860, filed on Dec. 20, 2019.

(51) Int. Cl.
*H01S 3/22*    (2006.01)
*G03F 7/00*    (2006.01)
(Continued)

(52) U.S. Cl.
CPC ........ *H01S 3/0346* (2013.01); *G03F 7/70916* (2013.01); *G03F 7/70933* (2013.01);
(Continued)

(58) Field of Classification Search
CPC ........ H01S 3/0346; H01S 3/225; H01S 3/036; H01S 3/08072
See application file for complete search history.

(56) References Cited

U.S. PATENT DOCUMENTS 5,018,161 A    5/1991  Akins et al.
5,359,620 A    10/1994 Akins
(Continued)

FOREIGN PATENT DOCUMENTS

CN    205281015 U    6/2016
CN    108418083 A    8/2018
(Continued)

OTHER PUBLICATIONS

Denis Herve, European International Searching Authority, International Search Report and Written Opinion, counterpart PCT Application No. PCT/US2020/064124, mailed Mar. 30, 2021, 11 pages total.
(Continued)

*Primary Examiner* — Kinam Park
(74) *Attorney, Agent, or Firm* — DiBerardino McGovern IP Group LLC

(57) ABSTRACT

A light source apparatus includes a chamber and a metal fluoride trap coupled to the chamber and configured to provide clean gas to a set of window housing apparatuses coupled to the chamber. Each window housing apparatus is configured to reduce metal fluoride dusting on an optical window and includes a window housing supporting an optical window, an aperture apparatus coupled to the window housing, and an insert disposed between the aperture apparatus and the optical window. The aperture apparatus includes a plurality of cells configured to trap metal fluoride dust flowing upstream from the chamber through the aperture apparatus toward the optical window. The insert is configured to control a first flow rate of the clean gas along
(Continued)

the optical window and a second flow rate of the clean gas through the aperture apparatus.

21 Claims, 8 Drawing Sheets

(51) Int. Cl.
*H01S 3/034* (2006.01)
*H01S 3/225* (2006.01)
H01S 3/036 (2006.01)
H01S 3/08 (2023.01)

(52) U.S. Cl.
CPC .............. *H01S 3/225* (2013.01); *H01S 3/036* (2013.01); *H01S 3/08072* (2013.01)

(56) References Cited

U.S. PATENT DOCUMENTS

| | | | |
|---|---|---|---|
| 5,373,523 A * | 12/1994 | Fujimoto | H01S 3/036 372/98 |
| 6,069,909 A | 5/2000 | Miller | |
| 6,240,117 B1 * | 5/2001 | Gong | G03F 7/70558 372/57 |
| 6,768,765 B1 | 7/2004 | Schroeder | |
| 6,868,106 B1 * | 3/2005 | Vogler | H01S 3/225 372/90 |
| 7,643,528 B2 | 1/2010 | Partlo et al. | |
| 7,819,945 B2 * | 10/2010 | Morton | B03C 3/49 96/83 |
| 7,822,092 B2 | 10/2010 | Ershov et al. | |
| 7,885,309 B2 | 2/2011 | Ershov et al. | |
| 8,126,027 B2 | 2/2012 | Algots et al. | |
| 2002/0044586 A1 * | 4/2002 | Myers | G01J 9/00 372/57 |
| 2002/0101900 A1 * | 8/2002 | Govorkov | H01S 3/225 372/57 |
| 2008/0144671 A1 | 6/2008 | Ershov et al. | |
| 2010/0107870 A1 | 5/2010 | Morton et al. | |
| 2015/0333469 A1 | 11/2015 | Yoshida | |

FOREIGN PATENT DOCUMENTS

| | | |
|---|---|---|
| CN | 207753290 U | 8/2018 |
| JP | H05167135 A | 7/1993 |
| JP | H07226550 A | 8/1995 |
| JP | H1074993 A | 3/1998 |
| JP | H1174601 A | 3/1999 |
| JP | 2003-218432 A | 7/2003 |
| JP | 2006140381 A | 6/2006 |
| WO | 9901915 A1 | 1/1999 |

OTHER PUBLICATIONS

Examiner Kazuki Asami, Office Action, counterpart Japanese Patent Application No. 2022-533236, mailed Jul. 19, 2023, 8 pages total (including English translation of 4 pages).

\* cited by examiner

DIRECTED GAS PURGE TO REDUCE DUSTING OF EXCIMER DISCHARGE CHAMBER WINDOWS

CROSS REFERENCE TO RELATED APPLICATIONS

This application claims priority to U.S. Application No. 62/951,860 filed Dec. 20, 2019 and titled DIRECTED GAS PURGE TO REDUCE DUSTING OF EXCIMER DISCHARGE CHAMBER WINDOWS, which is incorporated herein in its entirety by reference.

FIELD

The present disclosure relates to window housing apparatuses and systems, for example, window housing apparatuses and systems for reducing metal fluoride dusting.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern of a patterning device (e.g., a mask, a reticle) onto a layer of radiation-sensitive material (photoresist or, simply, "resist") provided on a substrate.

To project a pattern on a substrate a lithographic apparatus may use electromagnetic radiation. The wavelength of this radiation determines the minimum size of features which can be formed on the substrate. A lithographic apparatus, which uses deep ultraviolet (DUV) radiation, having a wavelength within the range 20-400 nm, for example 193 nm or 248 nm, may be used to form features on a substrate.

A master oscillator power amplifier (MOPA) or a master oscillator power ring amplifier (MOPRA) is a two-stage optical resonator arrangement that produces a highly coherent amplified light beam. The performance of the MOPA or the MOPRA can depend critically on the master oscillator (MO), the power amplifier (PA), and/or the power ring amplifier (PRA). Electrodes of the MO, the PA, and/or the PRA surrounding a gas discharge medium can degrade over time and produce metal fluoride dust. The metal fluoride dust can settle on optical windows of the MO, the PA, and/or the PRA and can lead to optical damage. Light beam fluences are higher in the PA or the PRA rather than the MO and, thus, metal fluoride dust can lead to earlier optical damage to the PA or the PRA over time. Further, circulation of metal fluoride dust in the MO, the PA, and/or the PRA can also lead to reduced discharge voltage from the electrodes and poor laser performance.

SUMMARY

Accordingly, there is a need to reduce metal fluoride dusting on optical windows, improve control of flow distribution through a window housing apparatus, provide an efficient purge without increasing clean gas backflow rates from a metal fluoride trap, and increase the service lifetimes of both the metal fluoride trap and the master oscillator.

In some embodiments, a light source apparatus includes a chamber, a metal fluoride trap, and a set of window housing apparatuses. The chamber is configured to hold a gas discharge medium, the gas discharge medium outputting a light beam. The metal fluoride trap is coupled to the chamber and is configured to trap metal fluoride dust generated from the chamber and provide clean gas, i.e. gas largely free of fluoride dust, along an output port. The set of window housing apparatuses is coupled to the chamber and is configured to reduce metal fluoride dusting on optical windows. Each window housing apparatus includes a window housing, an aperture apparatus, and an insert. The window housing supports an optical window. The aperture apparatus is coupled to the window housing and includes a plurality of cells configured to trap metal fluoride dust flowing upstream from the chamber through the aperture apparatus toward the optical window. The insert is disposed between the aperture apparatus and the optical window. The insert is configured to control a first flow rate of the clean gas along the optical window and a second flow rate of the clean gas through the aperture apparatus.

In some embodiments, the insert is configured such that the first flow rate along the optical window is greater than or equal to the second flow rate through the aperture apparatus. In some embodiments, the insert includes a channel configured to decrease the first flow rate along the optical window and increase the second flow rate through the aperture apparatus. In some embodiments, a cross-sectional area of the channel is proportional to the first flow rate decrease and the second flow rate increase.

In some embodiments, the window housing apparatus further includes a plug with a bore disposed between an input port of the window housing and the output port of the metal fluoride trap. In some embodiments, the plug and output port are disposed in a frame of the chamber. In some embodiments, the bore includes a diameter configured to control a flow rate of the clean gas into the window housing apparatus.

In some embodiments, a plurality of tangs are disposed on an exterior surface of the aperture apparatus and are configured to direct the clean gas to flow around the aperture apparatus toward the insert. In some embodiments, the plurality of tangs have an outer diameter greater than the exterior surface of the aperture apparatus to provide a gap for the clean gas to flow through.

In some embodiments, the window housing includes a channel configured to flush the clean gas along the optical window. In some embodiments, the window housing includes a Fresnel beam capture pocket configured to capture and absorb Fresnel reflections from the optical window to achieve a desired reflection-transmission ratio for the optical window.

In some embodiments, the gas discharge medium includes an excimer and/or an exciplex. In some embodiments, the gas discharge medium includes F2, ArF, KrF, and/or XeF.

In some embodiments, the light source apparatus further includes a set of optical elements configured to form an optical resonator around the chamber. In some embodiments, the set of optical elements includes an optical coupler in optical communication with a first window housing apparatus and a linewidth narrowing module in optical communication with a second window housing apparatus. In some embodiments, the set of optical elements includes a wavefront engineering box in optical communication with a first window housing apparatus and a beam reverser in optical communication with a second window housing apparatus.

In some embodiments, the insert is configured such that the first flow rate of the clean gas along the optical window is configured to reduce a thermal boundary layer along an interior surface of the optical window.

In some embodiments, a window housing apparatus configured to reduce metal fluoride dusting on an optical window includes a window housing, an aperture apparatus, and an insert. The window housing supports the optical window. The aperture apparatus is coupled to the window housing and includes a plurality of cells configured to trap metal fluoride dust flowing through the aperture apparatus toward the optical window. The insert is disposed between the aperture apparatus and the optical window. The insert is configured to control a first flow rate of clean gas along the optical window and a second flow rate of the clean gas through the aperture apparatus.

In some embodiments, the window housing includes a bore therein configured to receive the aperture apparatus and the insert. In some embodiments, the bore includes an undercut and/or a recess configured to increase a volume of the clean gas in the window housing apparatus. In some embodiments, the window housing includes a channel configured to direct the clean gas to flow along the optical window prior to flowing through aperture apparatus.

In some embodiments, a plurality of tangs are disposed along an exterior surface of the aperture apparatus and are configured to direct the clean gas to flow around the aperture apparatus toward the insert. In some embodiments, the plurality of tangs are symmetrically arranged. In some embodiments, the plurality of tangs of the aperture apparatus mechanically mate with a plurality of recesses in the insert.

In some embodiments, the aperture apparatus includes a plurality of cells each configured to trap metal fluoride dust flowing upstream from the chamber through the aperture apparatus toward the optical window. In some embodiments, the aperture apparatus includes at least five cells having a decreasing diameter from a front end to a back end toward the chamber.

In some embodiments, the window housing apparatus is configured such that the first flow rate along the optical window is greater than or equal to the second flow rate through the aperture apparatus.

In some embodiments, the insert includes a channel configured to decrease the first flow rate along the optical window and increase the second flow rate through the aperture apparatus. In some embodiments, a cross-sectional area of the channel is proportional to the first flow rate decrease and the second flow rate increase.

In some embodiments, a method of reducing metal fluoride dusting on an optical window in a window housing apparatus includes directing clean gas to flow from a metal fluoride trap through an input port of the window housing apparatus. In some embodiments, the method further includes directing the clean gas to flow around an aperture apparatus disposed in a window housing of the window housing apparatus and toward an insert disposed between the aperture apparatus and the optical window. In some embodiments, the method further includes directing the clean gas to flow through a channel in the window housing and along an interior surface of the optical window. In some embodiments, the method further includes directing the clean gas to flow from the optical window through the aperture apparatus.

In some embodiments, the directing clean gas to flow from the metal fluoride trap includes directing the clean gas to flow through a bore of a plug disposed between the input port and an output port of the metal fluoride trap. In some embodiments, a diameter of the bore is configured to control a flow rate of the clean gas into the window housing apparatus.

In some embodiments, the directing the clean gas to flow around the aperture apparatus includes directing the clean gas to flow through a plurality of tangs disposed on an exterior surface of the aperture apparatus.

In some embodiments, the directing the clean gas to flow around the aperture apparatus includes directing the clean gas to flow through a channel in the insert.

In some embodiments, the directing the clean gas to flow through the channel includes directing the clean gas to flow from the channel along the entire interior surface of the optical window.

In some embodiments, the directing the clean gas to flow from the optical window includes directing the clean gas to flow from the interior surface of the optical window toward the aperture apparatus and through a plurality of cells having a decreasing diameter from a front end to a back end of the aperture apparatus.

In some embodiments, the optical window forms part of a chamber configured to hold a gas discharge medium that outputs a light beam and further comprising causing the gas discharge medium to produce a light beam.

Implementations of any of the techniques described above may include a DUV light source, a system, a method, a process, a device, and/or an apparatus. The details of one or more implementations are set forth in the accompanying drawings and the description below. Other features will be apparent from the description and drawings, and from the claims.

Further features and exemplary aspects of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the relevant art(s) to make and use the embodiments.

Figure 1A:
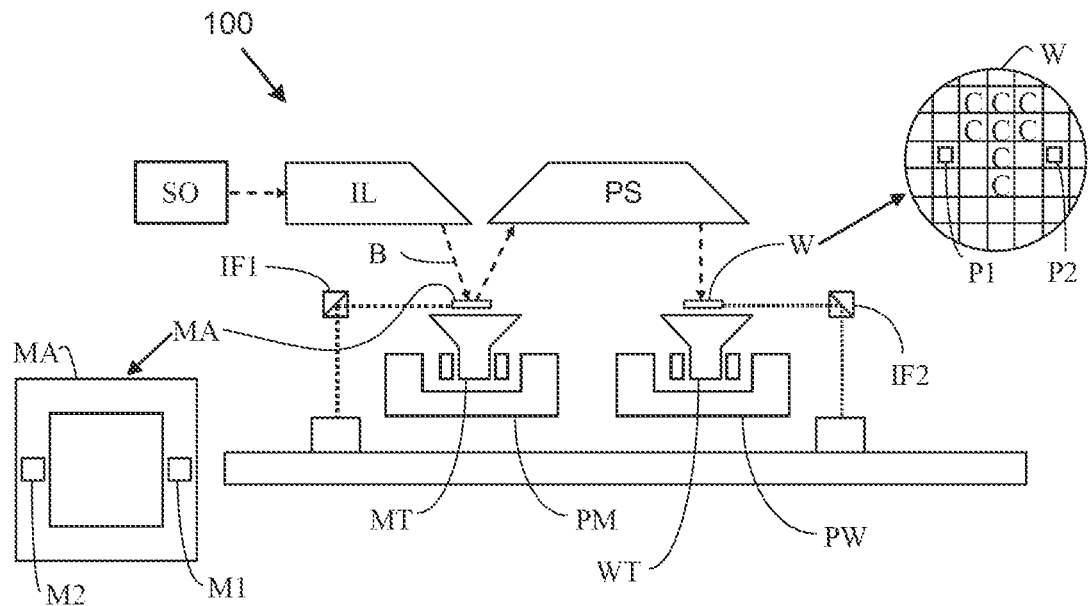
FIG. 1A is a schematic illustration of a reflective lithographic apparatus, according to an exemplary embodiment.

The features and exemplary aspects of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of this present invention. The disclosed embodiment(s) merely exemplify the present invention. The scope of the invention is not limited to the disclosed embodiment(s). The present invention is defined by the claims appended hereto.

The embodiment(s) described, and references in the specification to "one embodiment," "an embodiment," "an example embodiment," "an exemplary embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about" or "substantially" or "approximately" as used herein indicates the value of a given quantity that can vary based on a particular technology. Based on the particular technology, the term "about" or "substantially" or "approximately" can indicate a value of a given quantity that varies within, for example, 1-15% of the value (e.g., ±1%, ±2%, ±5%, ±10%, or ±15% of the value).

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present disclosure may be implemented.

Exemplary Lithographic System

Figure 1B:
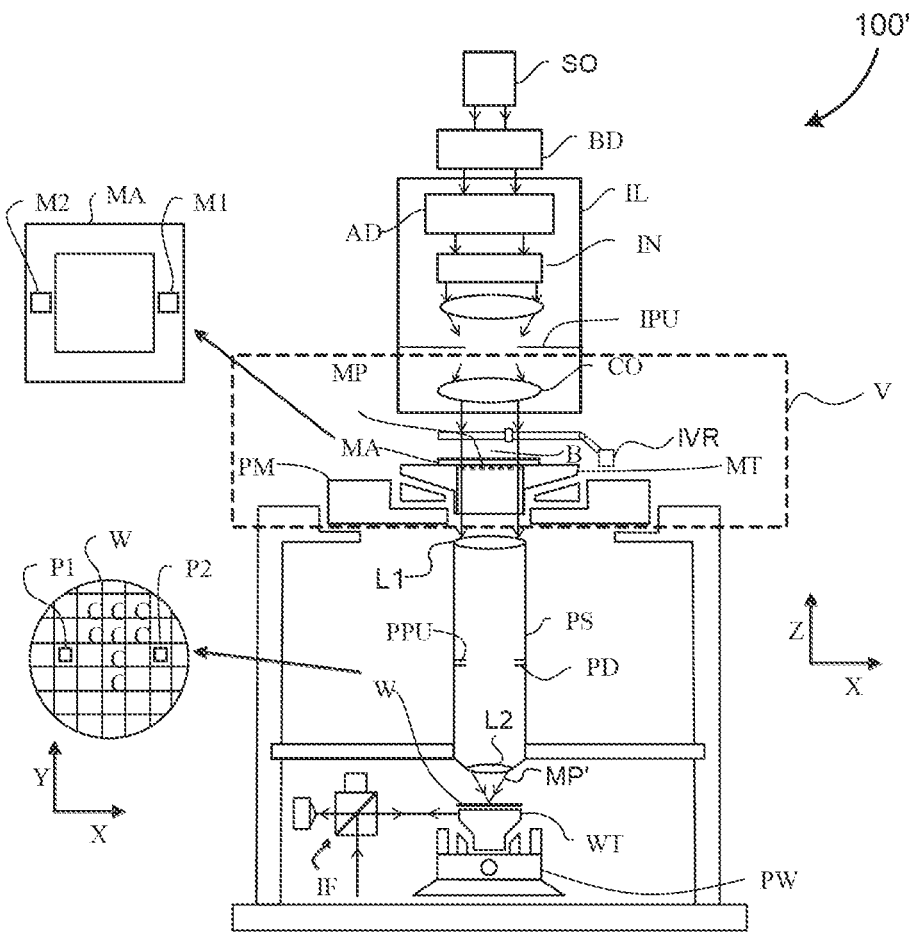
FIG. 1B is a schematic illustration of a transmissive lithographic apparatus, according to an exemplary embodiment.

FIGS. 1A and 1B are schematic illustrations of a lithographic apparatus 100 and lithographic apparatus 100', respectively, in which embodiments of the present invention may be implemented. Lithographic apparatus 100 and lithographic apparatus 100' each include the following: an illumination system (illuminator) IL configured to condition a radiation beam B (for example, deep ultraviolet (DUV) radiation); a support structure (for example, a mask table) MT configured to support a patterning device (for example, a mask, a reticle, or a dynamic patterning device) MA and connected to a first positioner PM configured to accurately position the patterning device MA; and, a substrate table (for example, a wafer table) WT configured to hold a substrate (for example, a photoresist coated wafer) W and connected to a second positioner PW configured to accurately position the substrate W. Lithographic apparatus 100 and 100' also have a projection system PS configured to project a pattern imparted to the radiation beam B by patterning device MA onto a target portion (for example, comprising one or more dies) C of the substrate W. In lithographic apparatus 100, the patterning device MA and the projection system PS are reflective. In lithographic apparatus 100', the patterning device MA and the projection system PS are transmissive.

The illumination system IL may include various types of optical components, such as refractive, reflective, catadioptric, magnetic, electromagnetic, electrostatic, or other types of optical components, or any combination thereof, for directing, shaping, or controlling the radiation beam B.

The support structure MT holds the patterning device MA in a manner that depends on the orientation of the patterning device MA with respect to a reference frame, the design of at least one of the lithographic apparatus 100 and 100', and other conditions, such as whether or not the patterning device MA is held in a vacuum environment. The support structure MT may use mechanical, vacuum, electrostatic, or other clamping techniques to hold the patterning device MA. The support structure MT can be a frame or a table, for example, which can be fixed or movable, as required. By using sensors, the support structure MT can ensure that the patterning device MA is at a desired position, for example, with respect to the projection system PS.

The term "patterning device" MA should be broadly interpreted as referring to any device that can be used to impart a radiation beam B with a pattern in its cross-section, such as to create a pattern in the target portion C of the substrate W. The pattern imparted to the radiation beam B can correspond to a particular functional layer in a device being created in the target portion C to form an integrated circuit.

The patterning device MA may be transmissive (as in lithographic apparatus 100' of FIG. 1B) or reflective (as in lithographic apparatus 100 of FIG. 1A). Examples of patterning devices MA include reticles, masks, programmable mirror arrays, or programmable LCD panels. Masks are well known in lithography, and include mask types such as binary, alternating phase shift, or attenuated phase shift, as well as various hybrid mask types. An example of a programmable mirror array employs a matrix arrangement of small mirrors, each of which can be individually tilted so as to reflect an incoming radiation beam in different directions. The tilted mirrors impart a pattern in the radiation beam B which is reflected by a matrix of small mirrors.

The term "projection system" PS can encompass any type of projection system, including refractive, reflective, catadioptric, magnetic, electromagnetic and electrostatic optical systems, or any combination thereof, as appropriate for the exposure radiation being used, or for other factors, such as the use of an immersion liquid on the substrate W or the use of a vacuum. A vacuum environment can be used for DUV or electron beam radiation since other gases can absorb too much radiation or electrons. A vacuum environment can therefore be provided to the whole beam path with the aid of a vacuum wall and vacuum pumps.

Lithographic apparatus 100 and/or lithographic apparatus 100' can be of a type having two (dual stage) or more substrate tables WT (and/or two or more mask tables). In such "multiple stage" machines, the additional substrate tables WT can be used in parallel, or preparatory steps can be carried out on one or more tables while one or more other substrate tables WT are being used for exposure. In some situations, the additional table may not be a substrate table WT.

The lithographic apparatus may also be of a type wherein at least a portion of the substrate may be covered by a liquid having a relatively high refractive index, e.g., water, so as to fill a space between the projection system and the substrate. An immersion liquid may also be applied to other spaces in the lithographic apparatus, for example, between the mask and the projection system Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

Referring to FIGS. 1A and 1B, the illuminator IL receives a radiation beam from a radiation source SO. The source SO and the lithographic apparatus 100, 100' can be separate physical entities, for example, when the source SO is an excimer laser (e.g., master oscillator power amplifier (MOPA) or master oscillator power ring amplifier (MOPRA)). In such cases, the source SO is not considered to form part of the lithographic apparatus 100 or 100', and the radiation beam B passes from the source SO to the illuminator IL with the aid of a beam delivery system BD (in FIG. 1B) including, for example, suitable directing mirrors and/or a beam expander. In other cases, the source SO can be an integral part of the lithographic apparatus 100, 100', for example, when the source SO is a mercury lamp. The source SO and the illuminator IL, together with the beam delivery system BD, if required, can be referred to as a radiation system.

The illuminator IL can include an adjuster AD (in FIG. 1B) for adjusting the angular intensity distribution of the radiation beam. Generally, at least the outer and/or inner radial extent (commonly referred to as "σ-outer" and "σ-inner," respectively) of the intensity distribution in a pupil plane of the illuminator can be adjusted. In addition, the illuminator IL can comprise various other components (in FIG. 1B), such as an integrator IN and a condenser CO. The illuminator IL can be used to condition the radiation beam B to have a desired uniformity and intensity distribution in its cross section.

Referring to FIG. 1A, the radiation beam B is incident on the patterning device (for example, mask) MA, which is held on the support structure (for example, mask table) MT, and is patterned by the patterning device MA. In lithographic apparatus 100, the radiation beam B is reflected from the patterning device (for example, mask) MA. After being reflected from the patterning device (for example, mask) MA, the radiation beam B passes through the projection system PS, which focuses the radiation beam B onto a target portion C of the substrate W. With the aid of the second positioner PW and position sensor IF2 (for example, an interferometric device, linear encoder, or capacitive sensor), the substrate table WT can be moved accurately (for example, so as to position different target portions C in the path of the radiation beam B). Similarly, the first positioner PM and another position sensor IF1 can be used to accurately position the patterning device (for example, mask) MA with respect to the path of the radiation beam B. Patterning device (for example, mask) MA and substrate W can be aligned using mask alignment marks M1, M2 and substrate alignment marks P1, P2.

Referring to FIG. 1B, the radiation beam B is incident on the patterning device (for example, mask MA), which is held on the support structure (for example, mask table MT), and is patterned by the patterning device. Having traversed the mask MA, the radiation beam B passes through the projection system PS, which focuses the beam onto a target portion C of the substrate W. The projection system has a pupil conjugate PPU to an illumination system pupil IPU. Portions of radiation emanate from the intensity distribution at the illumination system pupil IPU and traverse a mask pattern without being affected by diffraction at the mask pattern and create an image of the intensity distribution at the illumination system pupil IPU.

The projection system PS projects an image MV of the mask pattern MP, where image MV is formed by diffracted beams produced from the mark pattern MP by radiation from the intensity distribution, onto a photoresist layer coated on the substrate W. For example, the mask pattern MP may include an array of lines and spaces. A diffraction of radiation at the array and different from zeroth order diffraction generates diverted diffracted beams with a change of direction in a direction perpendicular to the lines. Undiffracted beams (i.e., so-called zeroth order diffracted beams) traverse the pattern without any change in propagation direction. The zeroth order diffracted beams traverse an upper lens or upper lens group of the projection system PS, upstream of the pupil conjugate PPU of the projection system PS, to reach the pupil conjugate PPU. The portion of the intensity distribution in the plane of the pupil conjugate PPU and associated with the zeroth order diffracted beams is an image of the intensity distribution in the illumination system pupil IPU of the illumination system IL. The aperture device PD, for example, is disposed at or substantially at a plane that includes the pupil conjugate PPU of the projection system PS.

The projection system PS is arranged to capture, by means of an upper lens or upper lens group L1 and a lower lens or lower lens group L2, not only the zeroth order diffracted beams, but also first-order or first- and higher-order diffracted beams (not shown). In some embodiments, dipole illumination for imaging line patterns extending in a direction perpendicular to a line may be used to utilize the resolution enhancement effect of dipole illumination. For example, first-order diffracted beams interfere with corresponding zeroth-order diffracted beams at the level of the wafer W to create an image MV of the line pattern MP at highest possible resolution and process window (i.e., usable depth of focus in combination with tolerable exposure dose deviations). In some embodiments, astigmatism aberration may be reduced by providing radiation poles (not shown) in opposite quadrants of the illumination system pupil IPU. For example, the illumination at the illumination system pupil IPU may use only two opposite illumination quadrants, sometimes referred to as BMW illumination, such that the remaining two quadrants are not used in the illumination but are configured to capture first-order diffracted beams. Further, in some embodiments, astigmatism aberration may be reduced by blocking the zeroth order beams in the pupil conjugate PPU of the projection system associated with radiation poles in opposite quadrants.

With the aid of the second positioner PW and position sensor IF (for example, an interferometric device, linear encoder, or capacitive sensor), the substrate table WT can be moved accurately (for example, so as to position different target portions C in the path of the radiation beam B). Similarly, the first positioner PM and another position sensor (not shown in FIG. 1B) can be used to accurately position the mask MA with respect to the path of the radiation beam B (for example, after mechanical retrieval from a mask library or during a scan).

In general, movement of the mask table MT can be realized with the aid of a long-stroke module (coarse positioning) and a short-stroke module (fine positioning), which form part of the first positioner PM. Similarly, movement of the substrate table WT can be realized using a long-stroke module and a short-stroke module, which form part of the second positioner PW. In the case of a stepper (as opposed to a scanner), the mask table MT can be connected to a short-stroke actuator only or can be fixed. Mask MA and substrate W can be aligned using mask alignment marks M1, M2, and substrate alignment marks P1, P2. Although the substrate alignment marks (as illustrated) occupy dedicated target portions, they can be located in spaces between target portions (known as scribe-lane alignment marks). Similarly, in situations in which more than one die is provided on the mask MA, the mask alignment marks can be located between the dies.

Mask table MT and patterning device MA can be in a vacuum chamber V, where an in-vacuum robot IVR can be used to move patterning devices such as a mask in and out of vacuum chamber. Alternatively, when mask table MT and patterning device MA are outside of the vacuum chamber, an out-of-vacuum robot can be used for various transportation operations, similar to the in-vacuum robot IVR. Both the in-vacuum and out-of-vacuum robots need to be calibrated for a smooth transfer of any payload (e.g., mask) to a fixed kinematic mount of a transfer station.

The lithographic apparatus 100 and 100' can be used in at least one of the following modes:

1. In step mode, the support structure (for example, mask table) MT and the substrate table WT are kept essentially stationary, while an entire pattern imparted to the radiation beam B is projected onto a target portion C at one time (i.e., a single static exposure). The substrate table WT is then shifted in the X and/or Y direction so that a different target portion C can be exposed.

2. In scan mode, the support structure (for example, mask table) MT and the substrate table WT are scanned synchronously while a pattern imparted to the radiation beam B is projected onto a target portion C (i.e., a single dynamic exposure). The velocity and direction of the substrate table WT relative to the support structure (for example, mask table) MT can be determined by the (de-)magnification and image reversal characteristics of the projection system PS.

3. In another mode, the support structure (for example, mask table) MT is kept substantially stationary holding a programmable patterning device, and the substrate table WT is moved or scanned while a pattern imparted to the radiation beam B is projected onto a target portion C. A pulsed radiation source SO can be employed and the programmable patterning device is updated as required after each movement of the substrate table WT or in between successive radiation pulses during a scan. This mode of operation can be readily applied to maskless lithography that utilizes a programmable patterning device, such as a programmable mirror array.

Combinations and/or variations on the described modes of use or entirely different modes of use can also be employed.

In a further embodiment, lithographic apparatus 100 includes an extreme ultraviolet (EUV) source, which is configured to generate a beam of EUV radiation for EUV lithography.

A relative vacuum, i.e. a small amount of gas (e.g. hydrogen) at a pressure well below atmospheric pressure, may be provided in the radiation source SO, in the illumination system IL, and/or in the projection system PS. The radiation source SO may be a laser produced plasma (LPP) source, a discharge produced plasma (DPP) source, a free electron laser (FEL), an excimer laser, a master oscillator power amplifier (MOPA), a master oscillator power ring amplifier (MOPRA), or any other radiation source that is capable of generating DUV radiation.

Exemplary Light Source Apparatus

As discussed above, a master oscillator power amplifier (MOPA) or a master oscillator power ring amplifier (MOPRA) is a two-stage optical resonator arrangement. The master oscillator (MO) (e.g., first optical resonator stage) produces a highly coherent light beam. The power amplifier (PA) or the power ring amplifier (PRA) (e.g., second optical resonator stage) increases the optical power of the light beam while preserving the beam properties. The MO can include a gas discharge chamber, an optical coupler (OC), and a linewidth narrowing module (LNM). The OC and the LNM can surround the gas discharge chamber to form an optical resonator. The PA or the PRA can include a second gas discharge chamber, a wavefront engineering box (WEB), and a beam reverser (BR). The WEB and the BR can surround the second gas discharge chamber to form a second optical resonator. For example, certain MOPAs and MOPRAs have been previously described in U.S. Pat. No. 7,643,528, issued Jan. 5, 2010, and U.S. Pat. No. 7,822,092, issued Oct. 26, 2010, which are hereby incorporated by reference herein in their entireties.

Performance of the MOPA or the MOPRA can depend critically on the MO, the PA, and/or the PRA, for example, the optical windows of the MO, the PA, and/or the PRA that output the light beam. An excimer laser utilizes an excimer (e.g., excited dimer) or an exciplex (e.g., excited complex) to output deep ultraviolet (DUV) radiation. An excimer is a short-lived homodimeric molecule formed from two species (e.g., $Ar_2$, $Kr_2$, $F_2$, $Xe_2$). An exciplex is a heterodimeric molecule formed from more than two species (e.g., ArF, KrCl, KrF, XeBr, XeCl, XeF). Electrodes of the MO, the PA, and/or the PRA surrounding the gas discharge medium (e.g., $F_2$, ArF, KrF, and/or XeF) can degrade over time and produce metal fluoride dust (e.g., average diameter of about 2.0 µm). Metal fluoride dust can settle on the optical windows of the MO, the PA, and/or the PRA and can lead to optical damage (e.g., local thermal adsorption and/or heating). Further, circulation of metal fluoride dust in the MO can also lead to reduced discharge voltage from the electrodes and poor laser performance.

In some embodiments, a metal fluoride trap (MFT) can be coupled to the chamber of the MO and to the chamber of the PA and/or the PRA to reduce contamination in the gas discharge medium. For example, certain MFTs have been previously described in U.S. Pat. No. 6,240,117, issued May 29, 2001, and U.S. Pat. No. 7,819,945, issued Oct. 26, 2010, which are hereby incorporated by reference herein in their entireties. As a portion of the gas discharge medium passes through the MFT, metal fluoride dust in the contaminated gas discharge medium is adsorbed in the trap filter and any remaining particles are collected by an electrostatic precipitator. The electrostatic precipitator induces an electrostatic charge in the dust particles flowing through the metal fluoride trap (MFT) via a strong electric field (e.g., applied potential of several kV). For example, a voltage can be applied to a center wire passing axially through a precipitation tube (e.g., cylindrical) that creates an electrostatic charge on the inner surface of the precipitation tube. Any remaining metal fluoride dust adheres to the inner surface of the precipitation tube. The resulting clean gas can be circulated back into the MO chamber, the PA chamber, and/or the PRA chamber through the disclosed optical window housings to keep the windows free from dust.

In some embodiments, however, MFT setups can still be unsuccessful in eliminating metal fluoride dust and providing clean gas (e.g., dust free) backflow to the optical window housings. For example, thermal overloading due to metal fluoride dust accumulation on an optical window may lead to catastrophic slip planes (e.g., $CaF_2$ crystal dislocation and/or plastic deformation), and may result in MO chamber, PA chamber, and/or PRA chamber replacement. Thus, reducing metal fluoride dusting on optical windows is critical since even a small amount of dusting may lead to irreparable changes in MO chamber, PA chamber, and/or PRA chamber performance and lifetime. Further, clean gas (e.g., dust free) backflow rates from the MFT may not be simply increased to remedy the dusting problem. By increasing a backflow rate of clean gas from the MFT (e.g., opening an input port), the MFT may accumulate metal fluoride dust at a much faster rate than MO chamber, PA chamber, and/or PRA chamber lifetime and, thus, may limit MFT functionality and overall light source lifetimes. In particular, light beam fluences are higher in the PA or the PRA rather than the MO and, thus, metal fluoride dust can lead to earlier optical damage to the PA or the PRA over time. Hence, an appropriate balance may be achieved between clean gas backflow rates (e.g., affects MFT lifetime) and efficiently purging an interior surface of optical windows (e.g., exposed to chamber) with clean gas backflow to reduce metal fluoride dusting on the optical windows (e.g., affects MO chamber, PA chamber, and/or PRA chamber lifetime).

Embodiments of light source apparatuses and systems as discussed below may reduce metal fluoride dusting on optical windows, improve control of flow distribution through a window housing apparatus, provide an efficient purge without increasing clean gas backflow rates from a metal fluoride trap, and increase the service lifetimes of both the metal fluoride trap and the master oscillator, the power amplifier, and/or the power ring amplifier to provide an excimer laser beam (e.g., DUV radiation), for example, to a DUV lithographic apparatus.

Figure 2:
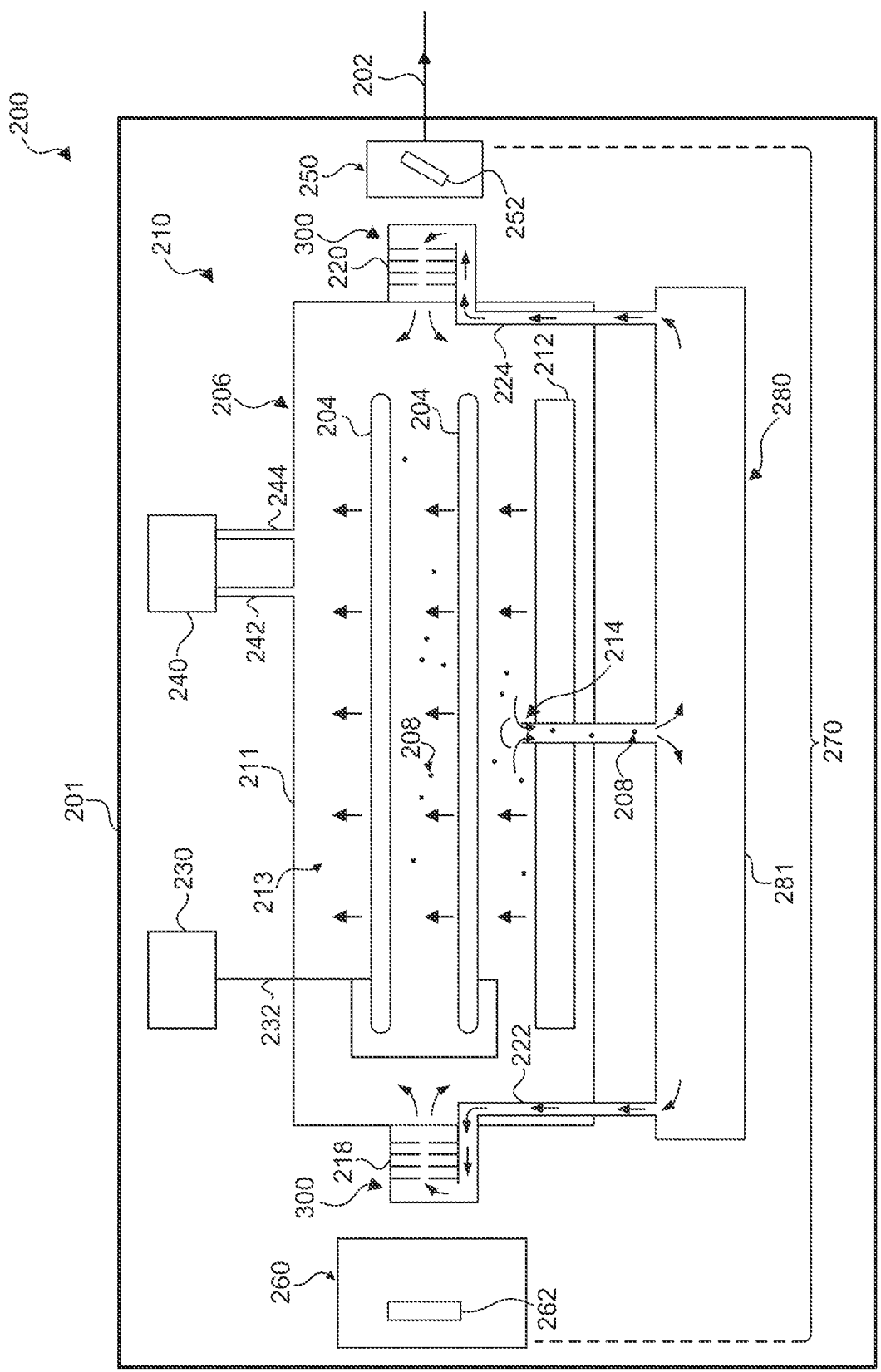
FIG. 2 is a schematic illustration of a light source apparatus, according to an exemplary embodiment.

FIG. 2 illustrates light source apparatus 200, according to various exemplary embodiments. Light source apparatus 200 can be configured to reduce metal fluoride dust contamination in gas discharge stage 210 (e.g., MO, PA, PRA) and provide a highly coherent and aligned light beam (e.g., light beam 202), for example, to a DUV lithographic apparatus (e.g., lithographic apparatus 100'). Light source apparatus 200 can be further configured to reduce metal fluoride dust accumulation on first and second window housing apparatuses 218, 220 and increase the service lifetime and laser performance of gas discharge stage 210 (e.g., MO, PA, PRA) and/or metal fluoride trap (MFT) 280. Although light source apparatus 200 is shown in FIG. 2 as a stand-alone apparatus and/or system, the embodiments of this disclosure can be used with other optical systems, such as, but not limited to, radiation source SO, lithographic apparatus 100, 100', and/or other optical systems. In some embodiments, light source apparatus 200 can be radiation source SO in lithographic apparatus 100, 100'. For example, DUV radiation beam B can be light beam 202. In some embodiments, light source apparatus 200 can be a MOPA or a MOPRA formed by gas discharge stage 210 (e.g., MO) and a second gas discharge stage (e.g., PA and/or PRA, similar to gas discharge stage 210) (not shown). As discussed above, for example, certain MOPAs and MOPRAs have been previously described in U.S. Pat. No. 7,643,528, issued Jan. 5, 2010, and U.S. Pat. No. 7,822,092, issued Oct. 26, 2010, which are hereby incorporated by reference herein in their entireties.

As shown in FIG. 2, light source apparatus 200 can include gas discharge stage 210, voltage control system 230, pressure control system 240, and MFT 280. In some embodiments, all of the above listed components can be housed in a three-dimensional (3D) frame 201. For example, the 3D frame 201 can include a metal (e.g., aluminum, steel, etc.), a ceramic, and/or any other suitable rigid material.

Gas discharge stage 210 can be configured to output a highly coherent light beam (e.g., light beam 202). Gas discharge stage 210 can include optical amplifier 206, first optical module 250 (e.g., optical coupler (OC), wavefront engineering box (WEB)), and second optical module 260 (e.g., linewidth narrowing module (LNM), beam reverser (BR)). In some embodiments, first optical module 250 can include first optical resonator element 252 and second optical module 260 can include second optical resonator element 262. Optical resonator 270 can be defined by first optical module 250 (e.g., via first optical resonator element 252) and second optical module 260 (e.g., via second optical resonator element 262). First optical resonator element 252 can be partially reflective (e.g., partial mirror) and second optical resonator element 262 can be reflective (e.g., mirror, grating, etc.) to form optical resonator 270. Optical resonator 270 can direct light generated by optical amplifier 206 (e.g., amplified spontaneous emission (ASE)) into optical amplifier 206 for a fixed number of passes to form light beam 202. In some embodiments, gas discharge stage 210 can output light beam 202 to a PA stage (not shown) as part of a MOPA arrangement or a PRA stage (not shown) as part of a MOPRA arrangement. In some embodiments, gas discharge stage 210 can be a MO stage, for example, with an OC and a LNM. In some embodiments, gas discharge stage 210 can be a PA stage, for example, with a WEB and a BR.

In some embodiments, gas discharge stage 210 can be a PRA stage, for example, with a WEB and a BR.

As shown in FIG. 2, optical amplifier 206 can include chamber 211, first window housing apparatus 218, and second window housing apparatus 220. Chamber 211 can be configured to hold gas discharge medium 213 within first and second window housing apparatuses 218, 220 Chamber 211 can include electrodes 204, metal fluoride dust 208, blower 212, gas discharge medium 213, input port 214 directed toward MFT 280, first output port 222 directed toward first window housing apparatus 218, and second output port 224 directed toward second window housing apparatus 220. Input port 214 can be configured to transfer a portion of gas discharge medium 213 with metal fluoride dust 208 in chamber 211 into MFT 280. First and second output ports 222, 224 can be configured to transfer a portion of gas discharge medium 213 (e.g., clean gas with metal fluoride dust 208 removed) from MFT 280 back through chamber 211 to first and second window housing apparatuses 218, 220, respectively.

Optical amplifier 206 can be optically coupled to first optical module 250 and second optical module 260. Optical amplifier 206 can be configured to output amplified spontaneous emission (ASE) and/or light beam 202. Light beam 202 can be produced in gas discharge medium 213 between electrodes 204 in chamber 211 in optical resonator 270 defined by first optical module 250 and second optical module 260 Chamber 211 can be coupled to MFT 280 and first and second window housing apparatuses 218, 220. Gas discharge medium 213 can be circulated between electrodes 204 in chamber 211 by blower 212. In some embodiments, blower 212 can be a tangential blower. A portion of gas discharge medium 213 can be extracted at input port 214 downstream of blower 212 and directed through MFT 280. Clean gas can be circulated back into chamber 211 through first and second window housing apparatuses 218, 220 to keep them free of laser debris (e.g., metal fluoride dust 208). In some embodiments, blower 212 and/or pressure control system 240 (e.g., vacuum line 244) can maintain a flow rate from chamber 211 into MFT 280 (e.g., input port 214) of about 100 sccm.

Gas discharge medium 213 can be configured to output ASE and/or light beam 202 (e.g., 193 nm). In some embodiments, gas discharge medium 213 can include a gas for excimer lasing (e.g., $Ar_2$, $Kr_2$, $F_2$, $Xe_2$, ArF, KrCl, KrF, XeBr, XeCl, XeF, etc.). For example, gas discharge medium 213 can include ArF and, upon excitation (e.g., applied voltage) from surrounding electrodes 204 in chamber 211, output ASE and/or light beam 202 (e.g., 193 nm) through first and second window housing apparatuses 218, 220. In some embodiments, gas discharge medium 213 can include an excimer and/or an exciplex. For example, gas discharge medium 213 can include $F_2$, ArF, KrF, and/or XeF.

First optical module 250 can be configured to be in optical communication with second window housing apparatus 220. In some embodiments, first optical module 250 can be configured to partially reflect a light beam and form part of optical resonator 270. For example, first optical modules (e.g., OCs, WEBs) have been previously described in U.S. Pat. No. 7,885,309, issued Feb. 8, 2011, and U.S. Pat. No. 7,643,528, issued Jan. 5, 2010, which are hereby incorporated by reference herein in their entireties. As shown in FIG. 2, first optical module 250 can include first optical resonator element 252 to direct light (e.g., ASE and/or light beam 202) from optical amplifier 206 back into optical amplifier 206 and/or output light beam 202. In some embodiments, first optical resonator element 252 can be adjusted (e.g., tilt).

Second optical module 260 can be configured to be in optical communication with first window housing apparatus 218. In some embodiments, second optical module 260 can be configured to provide spectral line narrowing to a light beam and form part of optical resonator 270. For example, second optical modules (e.g., LNMs, BRs) have been previously described in U.S. Pat. No. 8,126,027, issued Feb. 28, 2012, and U.S. Pat. No. 7,822,092, issued Oct. 26, 2010, which are hereby incorporated by reference herein in their entireties. As shown in FIG. 2, second optical module 260 can include second optical resonator element 262 to direct light (e.g., ASE and/or light beam 202) from optical amplifier 206 back into optical amplifier 206 toward first optical module 250. In some embodiments, second optical resonator element 262 can be adjusted (e.g., tilt, angular).

Voltage control system 230 can be configured to apply high voltage electrical pulses across electrodes 204 in chamber 211 to excite gas discharge medium 213 to output ASE and/or light beam 202 (e.g., 193 nm). Voltage control system 230 can include voltage supply line 232. In some embodiments, voltage control system 230 can include a high voltage power supply (not shown), a voltage compression amplifier (not shown), a pulse energy monitor (not shown), and/or a controller (not shown) for providing high voltage electrical pulses across electrodes 204. For example, a voltage control system has been previously described in U.S. Pat. No. 6,240,117, issued May 29, 2001, which is hereby incorporated by reference herein in its entirety.

Pressure control system 240 can be configured to control a fluorine concentration in chamber 211 and provide gas discharge medium 213 to chamber 211. Pressure control system 240 can include gas discharge line 242 and vacuum line 244. Gas discharge line 242 can be configured to provide one or more gas components (e.g., $Ar_2$, $Kr_2$, $F_2$, $Xe_2$, ArF, KrCl, KrF, XeBr, XeCl, XeF, KrNe, etc.) of gas discharge medium 213 to chamber 211. Vacuum line 244 can be configured to provide a negative pressure (e.g., draw out) a portion of gas discharge medium 213 in chamber 211, for example, during injection of one or more gas components to gas discharge medium 213 through gas discharge line 242. In some embodiments, pressure control system 240 can include one or more gas sources (not shown), one or more pressure regulators (not shown), a vacuum pump (not shown), a fluorine ($F_2$) trap, and/or a controller (not shown) for controlling a fluorine concentration in chamber 211 and refilling gas discharge medium 213 in chamber 211. For example, a pressure control system has been previously described in U.S. Pat. No. 6,240,117, issued May 29, 2001, which is hereby incorporated by reference herein in its entirety. In some embodiments, pressure control system 240 can be coupled to gas discharge stage 210 and configured to flow a portion of gas discharge medium 213 with metal fluoride dust 208 through input port 214 of MFT 280, through MFT 280 (e.g., packed-bed filter), and through first and/or second output port 222, 224 of MFT 280.

In some embodiments, MFT 280 can be configured to trap metal fluoride dust 208 generated in gas discharge medium 213 in chamber 211 of gas discharge stage 210. MFT 280 can be further configured to reduce metal fluoride dust 208 accumulation on first and second window housing apparatuses 218, 220 and increase the service lifetime and laser performance of gas discharge stage 210 (e.g., MO, PA, PRA). In some embodiments, MFT 280 can be external to 3D frame 201 of light source apparatus 200. For example, MFT 280 can be connected to chamber 211 via input port 214 and first and second output ports 222, 224 that can be extended so that MFT 280 is external to 3D frame 201.

In some embodiments, MFT 280 can include MFT frame 281, input port 214 coupled to chamber 211, first output port 222 coupled to chamber 211 and first window housing apparatus 218, and second output port 224 coupled to chamber 211 and second window housing apparatus 220. In some embodiments, MFT frame 281 can be cylindrical. For example, MFT frame 281 can be about 10 mm (diameter) by about 100 mm (length).

In some embodiments, input port 214 can be configured to transfer a portion of gas discharge medium 213 with metal fluoride dust 208 in chamber 211 into MFT 280. In some embodiments, gas discharge medium 213 can flow through a metal fluoride dust collector (not shown) (e.g., a packed-bed filter) and/or an electrostatic precipitator (not shown) and metal fluoride dust 208 can be adsorbed in MFT 280. First and second output ports 222, 224 can be configured to transfer a portion of gas discharge medium 213 (e.g., clean gas with metal fluoride dust 208 removed) that has passed through MFT 280 back through chamber 211 to first and second window housing apparatuses 218, 220, respectively. In some embodiments, MFT 280 can include an electrostatic precipitator (not shown) configured to induce an electric charge in metal fluoride dust 208 flowing through the MFT 280 and promote adsorption of remaining metal fluoride dust 208.

Exemplary Window Housing Apparatus

Figure 3:
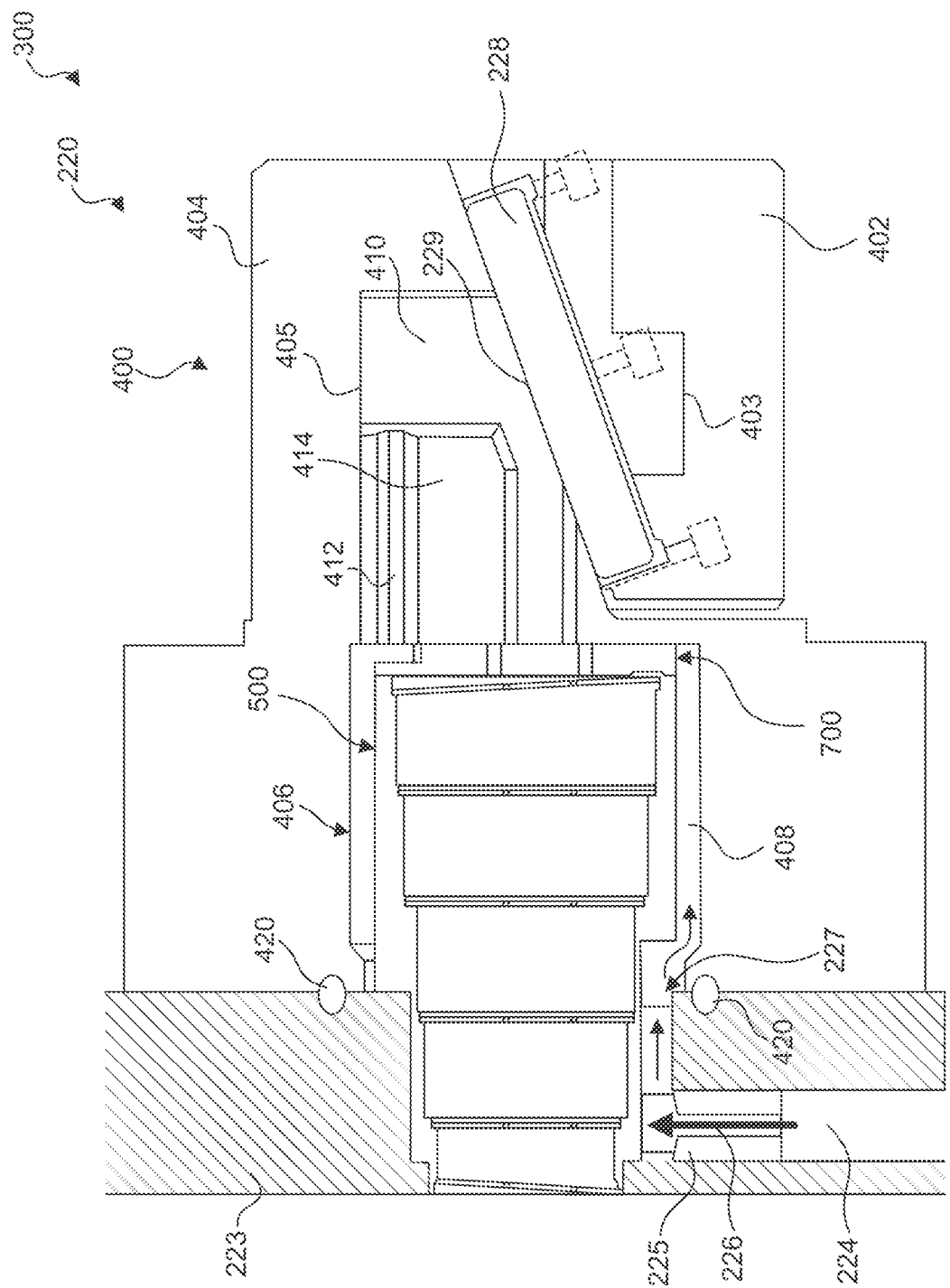
FIG. 3 is a schematic cross-sectional illustration of a window housing apparatus shown in FIG. 2, according to an exemplary embodiment.
Figure 4:
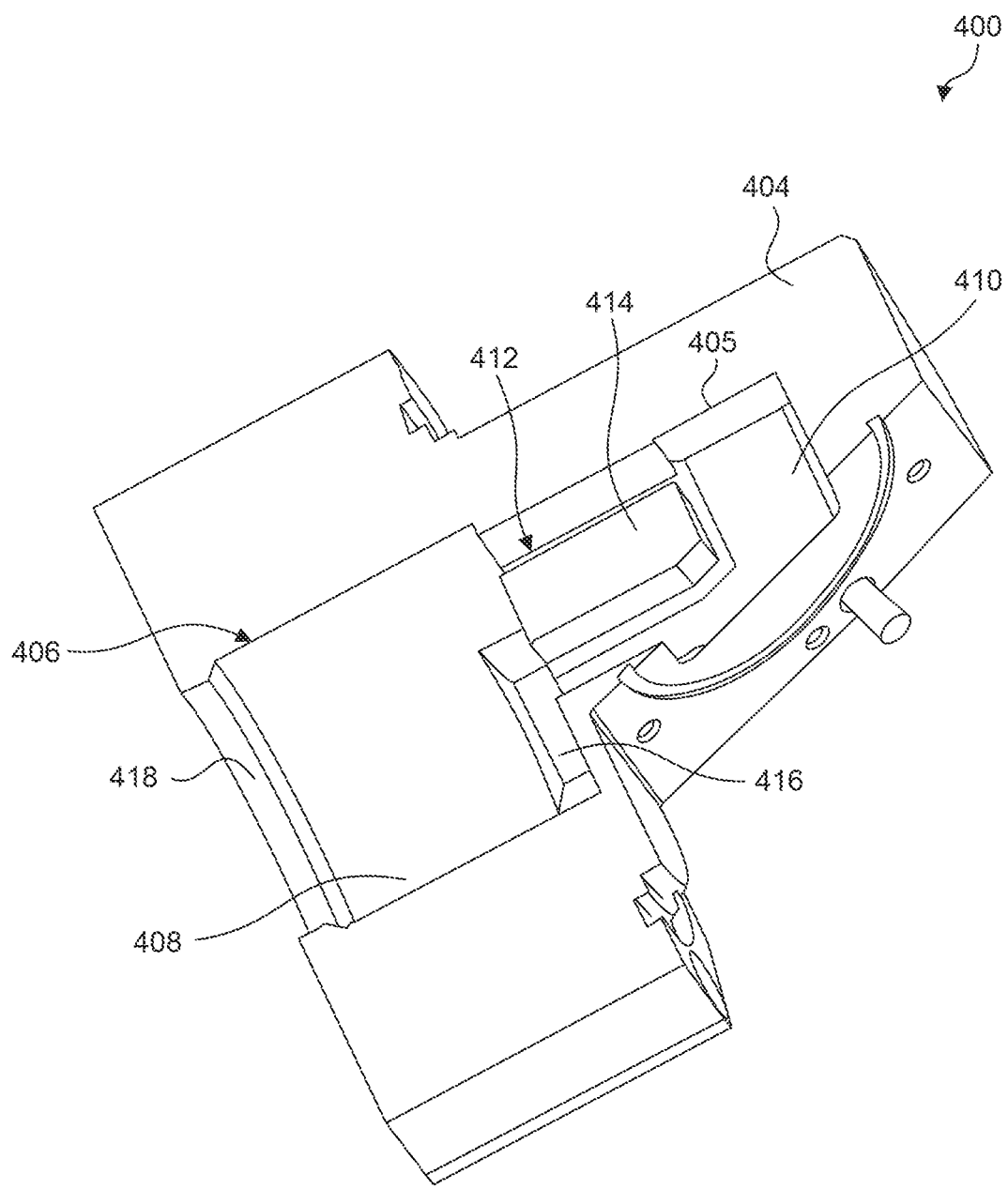
FIG. 4 is a schematic perspective cross-sectional illustration of a window housing of the window housing apparatus shown in FIG. 3, according to an exemplary embodiment.
Figure 5:
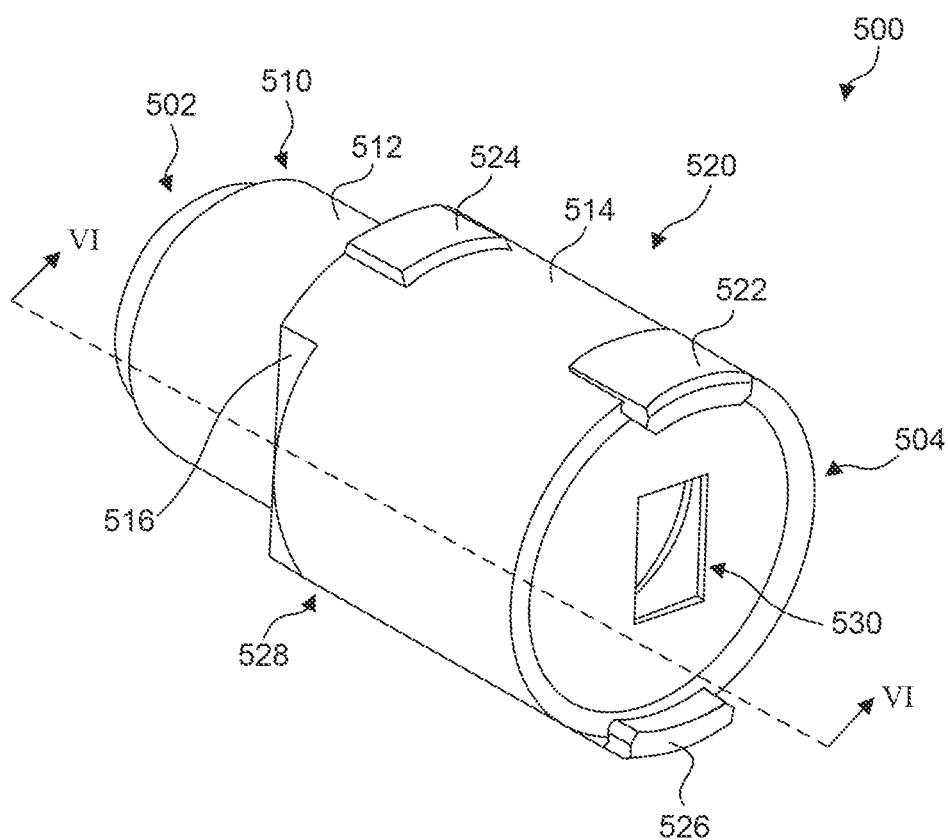
FIG. 5 is a schematic perspective illustration of an aperture apparatus of the window housing apparatus shown in FIG. 3, according to an exemplary embodiment.
Figure 7:
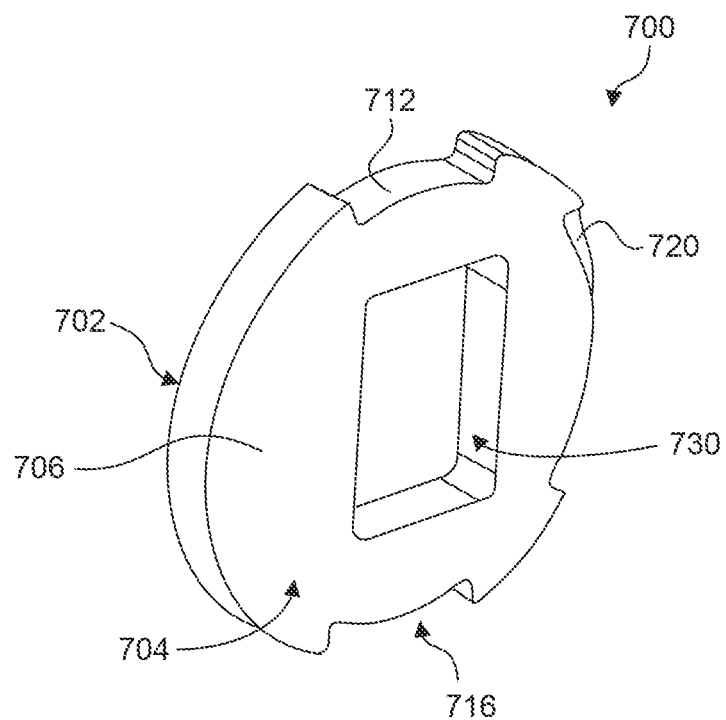
FIG. 7 is a schematic perspective illustration of an insert of the window housing apparatus shown in FIG. 3, according to an exemplary embodiment.
Figure 9:
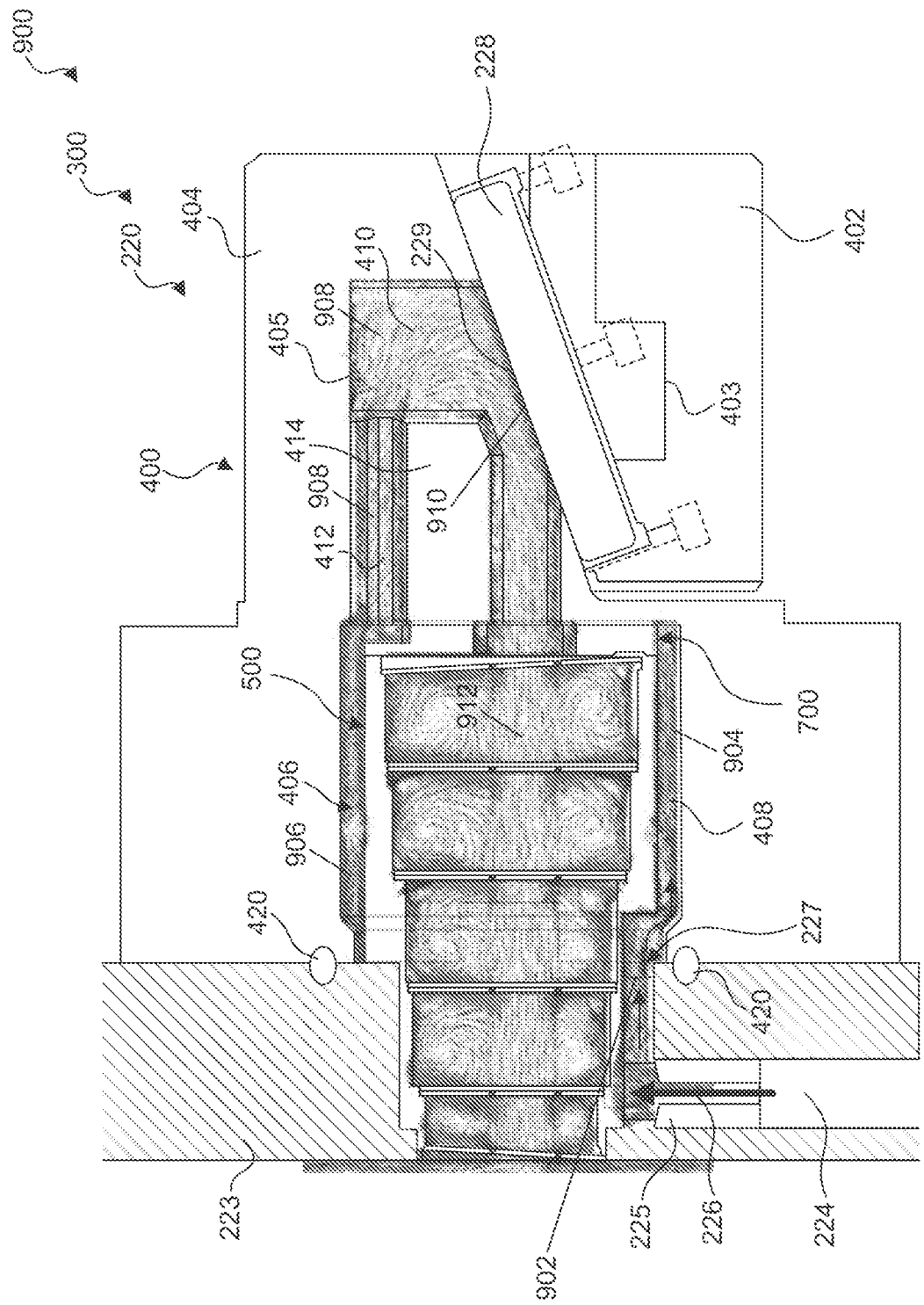
FIG. 9 is a schematic showing flow distribution of the window housing apparatus shown in FIG. 3, according to an exemplary embodiment.

FIG. 3 is a schematic cross-sectional illustration of window housing apparatus 300 (e.g., second window housing apparatus 220) of light source apparatus 200 shown in FIG. 2, according to an exemplary embodiment. FIG. 4 is a schematic perspective cross-sectional illustration of window housing 400 of window housing apparatus 300 (e.g., second window housing apparatus 220) shown in FIG. 3, according to an exemplary embodiment. FIG. 5 is a schematic perspective illustration of aperture apparatus 500 of window housing apparatus 300 (e.g., second window housing apparatus 220) shown in FIG. 3, according to an exemplary embodiment. FIG. 7 is a schematic perspective illustration of insert 700 of window housing apparatus 300 (e.g., second window housing apparatus 220) shown in FIG. 3, according to an exemplary embodiment. FIG. 9 is a schematic flow distribution of window housing apparatus 300 (e.g., second window housing apparatus 220) shown in FIG. 3, according to an exemplary embodiment.

In some embodiments, window housing apparatus 300 (e.g., second window housing apparatus 220) can be configured to reduce metal fluoride dusting on an optical window (e.g., optical window 228). Window housing apparatus 300 can be further configured to trap metal fluoride dusting and control a first flow rate of clean gas (e.g., dust free) along an optical window (e.g., optical window 228) and a second flow rate of clean gas (e.g., dust free) through an aperture apparatus (e.g., aperture apparatus 500). Window housing apparatus 300 can be further configured to reduce the formation of a thermal boundary layer (e.g., localized hot spots, thermal lensing, etc.) along an optical window (e.g., optical window 228).

In some embodiments, window housing apparatus 300 can be first window housing apparatus 218 and/or second window housing apparatus 220. For example, as shown in FIG. 3, window housing apparatus 300 can be second window housing apparatus 220. In some embodiments, first and second window housing apparatuses 218, 220 can be similar (e.g., mirror symmetric). For example, both first and second window housing apparatuses 218, 220 can be similar to window housing apparatus 300 (e.g., second window housing apparatus 220 can be identical to window housing apparatus 300 and first window housing apparatus 218 can be mirror symmetric to window housing apparatus 300). Although window housing apparatus 300 is shown in FIG. 3 as a stand-alone apparatus and/or system, the embodiments of this disclosure can be used with other optical systems, such as, but not limited to, radiation source SO, lithographic apparatus 100, 100', light source apparatus 200, optical amplifier 206, chamber 211, and/or other optical systems.

In some embodiments, window housing apparatus 300 can be coupled to chamber 211 (e.g., via O-ring seal 420) and input port 227 to receive clean gas (e.g., dust free and/or filtered gas) from MFT 280 along output port 224. In some embodiments, window housing apparatus 300 can include optical window 228, window housing 400, plug 225, aperture apparatus 500, and insert 700. In some embodiments, window housing apparatus 300 can extend into chamber 211. For example, as shown in FIG. 3, window housing apparatus 300 (e.g., back end 502 of aperture apparatus 500) can extend through an optical port (e.g., borehole 219) of chamber 211 into an interior of chamber 211.

Optical window 228 can be a beamsplitter (e.g., dichroic) configured to reflect and transmit ASE and/or light beam 202 from chamber 211. For example, as shown in FIG. 3, optical window 228 can be arranged in window housing 400 at an angle of incidence (e.g., about 70 degrees) in order to direct (e.g., reflect) a portion of the ASE and/or light beam 202 toward upper window housing 404 (e.g., upper Fresnel beam capture pocket 405) and to direct (e.g., transmit) a portion of the ASE and/or light beam 202 toward lower window housing 402 (e.g., lower Fresnel beam capture pocket 403).

Window housing 400 can be configured to support optical window 228. Window housing 400 can be further configured to flush clean gas along interior surface 229 of optical window 228. Window housing 400 can be further configured to provide a desired reflection-transmission ratio for optical window 228 (e.g., via lower and upper Fresnel beam capture pockets 403, 405). Although window housing 400 (e.g., upper window housing 404) is shown in FIG. 4 as a stand-alone apparatus and/or system, the embodiments of this disclosure can be used with other optical systems, such as, but not limited to, radiation source SO, lithographic apparatus 100, 100', light source apparatus 200, optical amplifier 206, chamber 211, window housing apparatus 300, first window housing apparatus 218, second window housing apparatus 220, and/or other optical systems. In some embodiments, window housing 400 can include a metal (e.g., stainless steel, aluminum, etc.), a ceramic, a polymer, and/or any other suitable rigid material.

As shown in FIGS. 3 and 4, in some embodiments, window housing 400 can include lower window housing 402 and upper window housing 404. Lower and upper window housings 402, 404 can support optical window 228 and be connected along optical window 228. For example, lower and upper window housings 402, 404 and optical window 228 can form a sealed assembly, for example, via a window O-ring seal and/or one or more fasteners. Lower window housing 402 can be configured to receive a light beam (e.g., light beam 202) and transmit the light beam into window housing apparatus 300 (e.g., to upper window housing 404) and into chamber 211. Lower window housing 402 can include lower Fresnel beam capture pocket 403 configured to capture and absorb (e.g., multiple beam bounce) a portion of the light beam (e.g., ASE and/or light beam 202) from optical window 228 (e.g., from Fresnel reflections). Lower Fresnel beam capture pocket 403 can be configured to capture and absorb Fresnel reflections from optical window 228 to achieve a desired reflection-transmission ratio for optical window 228. Lower window housing 402 can be separated (e.g. fluidly) from chamber 211 and metal fluoride dust 208 and, thus, may not receive clean gas from MFT 280. In some embodiments, lower window housing 402 (e.g., exterior) can be purged by a separate clean gas (e.g., $N_2$).

Upper window housing 404 can be configured to receive a light beam (e.g., ASE and/or light beam 202) and transmit the light beam out of window housing apparatus 300 (e.g., to lower window housing 402) and out of optical amplifier 206. Upper window housing 404 can include upper Fresnel beam capture pocket 405, housing bore 406, housing port 410, housing channel 412, housing D-slot 414, and chamber O-ring seal 420. Upper Fresnel beam capture pocket 405 can be configured to capture and absorb (e.g., multiple beam bounce) a portion of the light beam (e.g., ASE and/or light beam 202) from optical window 228 (e.g., from Fresnel reflections). Upper Fresnel beam capture pocket 405 can be configured to capture and absorb Fresnel reflections from optical window 228 to achieve a desired reflection-transmission ratio for optical window 228. As shown in FIG. 3, upper window housing 404 can be coupled to chamber 211 (e.g., chamber frame 223 and borehole 219) via O-ring seal 420. For example, back end 502 of aperture apparatus 500 and input port 227 can be disposed within an inner diameter of O-ring seal 420 in order to fluidly seal chamber 211 and output port 224 to input port 227, aperture apparatus 500, and window housing 400. In some embodiments, O-ring seal 420 can be a metal (e.g., monel, nickel, stainless steel, copper, aluminum, etc.). In some embodiments, upper window housing 404 (e.g., interior) can be purged by clean gas from MFT 280 (e.g., gas largely free of fluoride dust).

Housing bore 406 can be configured to receive aperture apparatus 500 (e.g., window portion 520) and insert 700. Housing bore 406 can include housing bore undercut 408, housing recess 416, and housing lip 418. Housing bore undercut 408 and/or housing recess 416 can be configured to increase a volume of clean gas in window housing apparatus 300. For example, an outer diameter of housing bore undercut 408 and/or housing recess 416 can be greater than an outer diameter of aperture apparatus 500 and/or insert 700 in order to direct clean gas around aperture apparatus 500 and toward insert 700. Housing recess 416 can be configured to form a tight fluid seal with aperture apparatus 500 (e.g., first and third tangs 522, 526) and insert 700. Housing lip 418 can be configured to form a tight fluid seal with aperture apparatus 500 (e.g., window portion 520) and input port 227. Housing lip 418 can have a smaller diameter than housing bore undercut 408.

Housing port 410, housing channel 412, and housing D-slot 414 can be configured to direct clean gas to flow through housing channel 412, into housing port 410, along interior surface 229 of optical window 228, and toward insert 700 and aperture apparatus 500. Housing channel 412 can be configured to flush clean gas (e.g., dust free) along interior surface 229 of optical window 228. Housing channel 412 can be further configured to direct clean gas to flow along optical window 228 prior to flowing through aperture apparatus 500 and insert 700. In some embodiments, housing channel 412 and/or housing port 410 can be configured to direct clean gas to flow from housing channel 412 along the entire interior surface 229 of optical window 228. Housing bore 406 can be fluidly connected to housing channel 412 and housing port 410 (e.g., around housing D-slot 414).

In some embodiments, window housing apparatus 300 can include plug 225 with bore 226. In some embodiments, plug 225 can be disposed between input port 227 and output port 224. For example, as shown in FIG. 3, output port 224 can be disposed within chamber 211 (e.g., in chamber frame 223) and plug 225 can be disposed within output port 224. Plug 225 can include rubber, silicone, cork, and/or any other suitable material capable of blocking fluid flow between output port 224 and input port 227 except through bore 226. In some embodiments, plug 225 can be replaced and/or exchanged for a similar plug with a different bore diameter (e.g., 70 mils to 50 mils, 60 mils to 100 mils, etc.) in order to control (e.g., increase or decrease) a flow rate (e.g., 100 sccm) of clean gas into window housing apparatus 300.

Bore 226 can be a through-hole fluidly connecting clean gas between output port 224 and input port 227 of window housing apparatus 300. Bore 226 can have a diameter configured to control a flow rate of clean gas from MFT 280 into window housing apparatus 300. For example, the diameter (d) of bore 226 can be proportional (e.g., $d^4$) to the flow rate of clean gas into input port 227 (e.g., decrease in diameter is proportional to decrease (e.g., sixteen fold) in flow rate, increase in diameter is proportional to increase (e.g., sixteen fold) in flow rate). In some embodiments, the diameter of bore 226 can be about 50 mils (1.27 mm) to about 150 mils (3.81 mm) but other diameters are used in other embodiments. For example, the diameter of bore 226 can be about 70 mils (1.778 mm).

In some embodiments, flow distribution of clean gas from MFT 280 proceeds along output port (e.g., first and/or second output ports 222, 224), through bore 226 of plug 225, through input port 227, through housing bore undercut 408, around aperture apparatus 500 (e.g., around second exterior surface 514 between first and second tangs 522, 524 and third and fourth tangs 526, 528), toward insert 700, through housing channel 412, through housing port 410 and around housing D-slot 414, through insert 700, and through aperture apparatus 500.

Exemplary Aperture Apparatus

Figure 6:
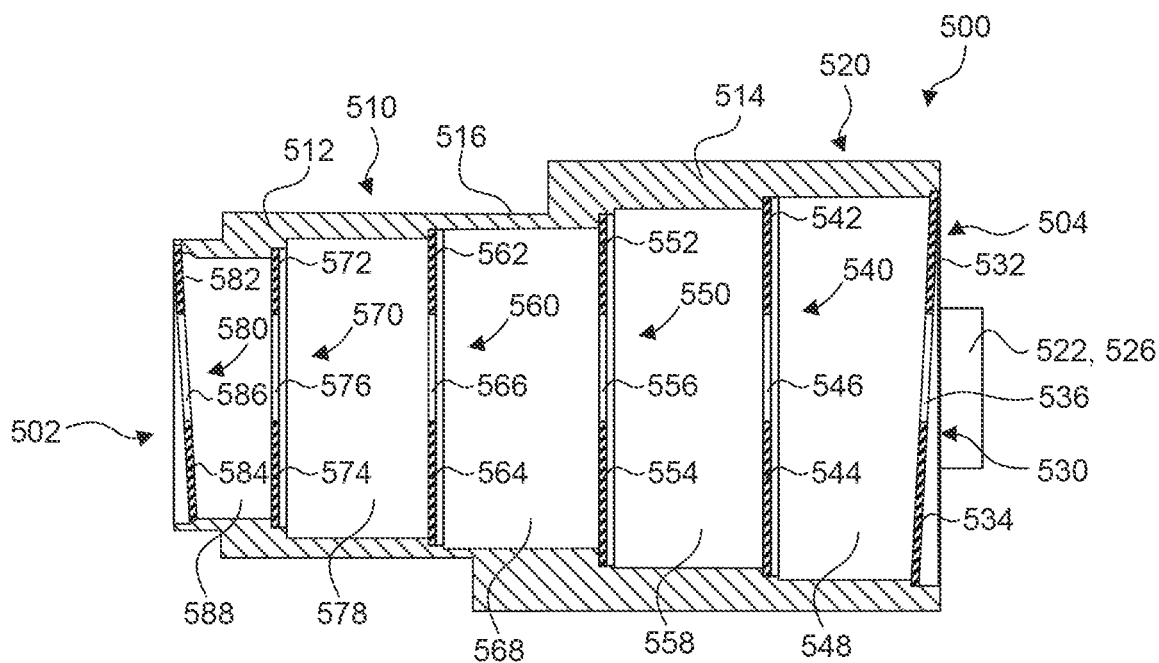
FIG. 6 is a schematic cross-sectional illustration of the aperture apparatus shown in FIG. 5, according to an exemplary embodiment.

FIG. 5 is a schematic perspective illustration of aperture apparatus 500 of window housing apparatus 300 (e.g., second window housing apparatus 220) shown in FIG. 3, according to an exemplary embodiment. FIG. 6 is a schematic cross-sectional illustration of aperture apparatus 500 shown in FIG. 5, according to an exemplary embodiment.

Aperture apparatus 500 can be configured to trap metal fluoride dust 208 flowing through aperture apparatus 500. Although aperture apparatus 500 is shown in FIGS. 5 and 6 as a stand-alone apparatus and/or system, the embodiments of this disclosure can be used with other optical systems, such as, but not limited to, radiation source SO, lithographic apparatus 100, 100', light source apparatus 200, optical amplifier 206, chamber 211, window housing apparatus 300, first window housing apparatus 218, second window housing apparatus 220, window housing 400, and/or other optical systems.

As shown in FIGS. 5 and 6, in some embodiments, aperture apparatus 500 can include back end 502, front end 504, chamber portion 510, window portion 520, and a plurality of cells 548, 558, 568, 578, 588. Back end 502 can be toward chamber 211 and front end 504 can be toward optical window 228. Chamber portion 510 can be configured to extend into chamber 211 (e.g., via borehole 219 in chamber frame 223). Chamber portion 510 can include first exterior surface 512 having a first diameter. In some embodiments, aperture apparatus 500 can include a metal (e.g., monel, nickel, stainless steel, aluminum, etc.), a ceramic, and/or any other suitable rigid material.

Window portion 520 can be configured to extend into window housing 400 (e.g., via housing bore 406). Window portion 520 can include second exterior surface 514 having a second diameter larger than first diameter of chamber portion 510. Window portion 520 can include notch 516 and a plurality of tangs 522, 524, 526, 528. Notch 516 can be configured to provide input port 227 with window housing 400 and chamber frame 223.

Tangs 522, 524, 526, 528 can be configured to direct clean gas to flow around aperture apparatus 500 (e.g., second exterior surface 514) toward insert 700. As shown in FIG. 5, tangs 522, 524, 526, 528 can be disposed on second exterior surface 514. Tangs 522, 524, 526, 528 can have a larger outer diameter than second exterior surface 514 in order to provide a small gap for clean gas to flow through toward insert port 720 of insert 700. First and second tangs 522, 524 can be separated from each other along second exterior surface 514, and third and fourth tangs 526, 528 can be separated from each other along second exterior surface 514. In some embodiments, as shown in FIG. 5, first and second tangs 522, 524 and third and fourth tangs 526, 528 can be symmetrically arranged (e.g., 2-fold symmetry, 180 degree rotation). In some embodiments, as shown in FIG. 5, first tang 522 and third tang 526 can extend beyond front end 504 (e.g., first baffle 530) in order to couple to insert 700 and/or housing bore 406 (e.g., housing recess 416). For example, first tang 522 and third tang 526 can be configured to mechanically mate with recesses 712, 716 of insert 700.

Cells 548, 558, 568, 578, 588 can be configured to trap metal fluoride dust 208 flowing upstream from chamber 211 through aperture apparatus 500 toward optical window 228 (e.g., via baffles 530, 540, 550, 560, 570, 580 and/or Venturi effect). Each cell 548, 558, 568, 578, 588 can be configured to trap metal fluoride dust 208 flowing upstream from chamber 211 through aperture apparatus 500 toward optical window 228 (e.g., downstream flow of clean gas is from front end 504 toward back end 502 and upstream flow of metal fluoride dust 208 from chamber 211 is from back end 502 toward front end 504). In some embodiments, cells 548, 558, 568, 578, 588 can have a decreasing outer diameter from front end 504 to back end 502 toward chamber 211. For example, as shown in FIG. 6, cell 548 can have a larger diameter than cell 558, that can have a larger diameter than cell 568, that can have a larger diameter than cell 578, that can have a larger diameter than cell 588.

As shown in FIG. 6, each cell 548, 558, 568, 578, 588 can be formed from corresponding baffles 530, 540, 550, 560, 570, 580. First baffle 530 (e.g., at front end 504) can include first upper baffle 532, first lower baffle 534, and first aperture 536. Second baffle 540 can include second upper baffle 542, second lower baffle 544, and second aperture 546. Third baffle 550 can include third upper baffle 552, third lower baffle 554, and third aperture 556. Fourth baffle 560 can include fourth upper baffle 562, fourth lower baffle 564, and fourth aperture 566. Fifth baffle 570 can include fifth upper baffle 572, fifth lower baffle 574, and fifth aperture 576. Sixth baffle 580 (e.g., at back end 502) can include sixth upper baffle 582, sixth lower baffle 584, and sixth aperture 586. First cell 548 can be formed between first baffle 530 and second baffle 540, second cell 558 can be formed between second baffle 540 and third baffle 550, third cell 568 can be formed between third baffle 550 and fourth baffle 560, fourth cell 578 can be formed between fourth baffle 560 and fifth baffle 570, and fifth cell 588 can be formed between fifth baffle 570 and sixth baffle 580.

In some embodiments, apertures 536, 546, 556, 566, 576, 586 can have the same diameter while in other embodiments, their diameters differ. In some embodiments, one or more baffles 530, 540, 550, 560, 570, 580 can be angled relative to a transverse axis of aperture apparatus 500. For example, as shown in FIG. 6, first baffle 530 can be angled toward front end 504 and sixth baffle 580 can be angled toward back end 502.

Exemplary Inserts

Figure 8:
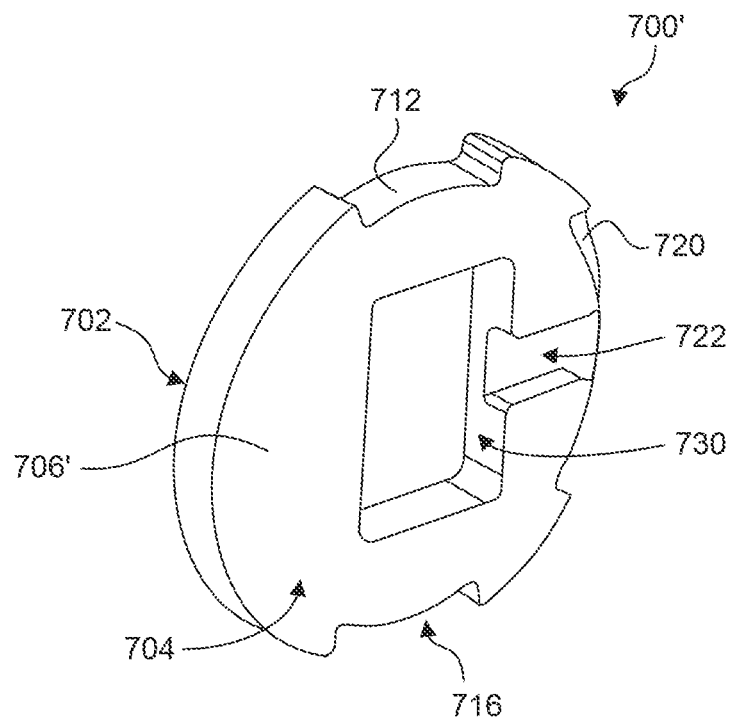
FIG. 8 is a schematic perspective illustration of an insert, according to an exemplary embodiment.

FIGS. 7 and 8 are schematic perspective illustrations of inserts 700, 700', according to various exemplary embodiments. FIG. 7 is a schematic perspective illustration of insert 700 of window housing apparatus 300 (e.g., second window housing apparatus 220) shown in FIG. 3, according to an exemplary embodiment.

Insert 700 can be configured to control a first flow rate of clean gas along optical window 228 and a second flow rate of clean gas through aperture apparatus 500. Insert 700 can be disposed between aperture apparatus 500 and optical window 228. In some embodiments, the first flow rate along optical window 228 can be greater than or equal to the second flow rate through aperture apparatus 500. Although insert 700 is shown in FIG. 7 as a stand-alone apparatus and/or system, the embodiments of this disclosure can be used with other optical systems, such as, but not limited to, radiation source SO, lithographic apparatus 100, 100', light source apparatus 200, optical amplifier 206, chamber 211, window housing apparatus 300, first window housing apparatus 218, second window housing apparatus 220, window housing 400, aperture apparatus 500, and/or other optical systems.

As shown in FIG. 7, in some embodiments, insert 700 can include back end 702, front end 704, first recess 712, second recess 716, insert port 720, and insert aperture 730. Back end 702 can be toward aperture apparatus 500 (e.g., front end 504) and front end 704 can be toward optical window 228. Front end 704 can include front surface 706. Insert 700 can have a similar outer diameter to front end 504 of aperture apparatus 500. In some embodiments, insert 700 can include a metal (e.g., monel, nickel, stainless steel, aluminum, etc.), a ceramic, and/or any other suitable rigid material.

First and second recesses 712, 716 can be configured to mechanically mate with first and third tangs 522, 526 of aperture apparatus 500 in order to fluidly seal aperture apparatus 500 and insert 700 together. Insert port 720 can be configured to mate with housing recess 416 and/or direct clean gas to flow toward housing channel 412. Insert aperture 730 can be configured to direct clean gas to flow through aperture apparatus 500 (e.g., first baffle 530). In some embodiments, insert aperture 730 can be similar (e.g., rectangular aperture) to first baffle 530 of aperture apparatus 500. For example, a diameter of insert aperture 730 can be the same as apertures 536, 546, 556, 566, 576, 586.

FIG. 8 is a schematic perspective illustration of insert 700', according to an exemplary embodiment. The embodiments of insert 700 shown in FIG. 7 and the embodiments of insert 700' shown in FIG. 8 may be similar. Similar reference numbers are used to indicate similar features of the embodiments of insert 700 shown in FIG. 7 and the similar features of the embodiments of insert 700' shown in FIG. 8. One difference between the embodiments of insert 700 shown in FIG. 7 and the embodiments of insert 700' shown in FIG. 8 is that insert 700' includes insert channel 722 in front surface 706' configured to direct a portion of clean gas to flow through insert aperture 730 and decrease a first flow rate along interior surface 229 of optical window 228 rather than front surface 706 of insert 700 shown in FIG. 7.

As shown in FIG. 8, an exemplary aspect of insert 700' is insert channel 722 configured to direct a portion of clean gas to flow through insert aperture 730 and decrease a first flow rate along interior surface 229 of optical window 228, for example, by diverting a portion of clean gas flowing toward housing channel 412, housing port 410, and optical window 228 to insert aperture 730. In some embodiments, insert channel 722 can be configured to decrease the first flow rate along optical window 228 and increase the second flow rate through aperture apparatus 500. For example, a cross-sectional area (e.g., a diameter d) of insert channel 722 can be proportional (e.g., $d^4$) to the first flow rate decrease along interior surface 229 of optical window 228 and the second flow rate increase into insert aperture 730 (e.g., decrease in diameter of insert channel 722 is proportional to a decrease (e.g., sixteen fold) of second flow rate into insert aperture 730 and an increase (e.g., sixteen fold) of first flow rate along interior surface 229 of optical window 228). Similarly, an increase in diameter of insert channel 722 is proportional to a decrease (e.g., sixteen fold) of first flow rate along interior surface 229 of optical window 228 and an increase (e.g., sixteen fold) of second flow rate into insert aperture 730. Insert channel 722 can divert a portion of clean gas flowing toward housing channel 412, housing port 410, and optical window 228 to insert aperture 730 and first baffle 530 of aperture apparatus 500 and, thus, decrease the first flow rate to optical window 228 and increase the second flow rate through aperture apparatus 500.

Exemplary Flow Distribution

FIG. 9 is a schematic showing flow distribution 900 of window housing apparatus 300 (e.g., second window housing apparatus 220) shown in FIG. 3, according to an exemplary embodiment. As shown in FIG. 9, flow distribution 900 includes first flow location 902 (e.g., input port 227), second flow location 904 (e.g., housing bore undercut 408), third flow location 906 (e.g., around window portion 520), fourth flow location 908 (e.g., through housing channel 412), fifth flow location 910 (e.g., through housing port 410 and along interior surface 229 of optical window 228), and sixth flow location 912 (e.g., through insert 700 and aperture apparatus 500). The direction of clean gas flow (e.g., flow distribution 900) in window housing apparatus 300 (e.g., second window housing apparatus 220) follows successive flow locations 902, 904, 906, 908, 910, 912. In some embodiments, flow distribution 900 extends along the entire interior surface 229 of optical window 228 in order to reduce metal fluoride dusting on optical window 228.

In some embodiments, flow distribution 900 in window housing apparatus 300 can be laminar or near laminar flow. For example, flow distribution 900 along interior surface 229 of optical window 228 can be laminar or near laminar flow to disrupt any thermal boundary layer forming on interior surface 229. In some embodiments, flow distribution 900 in window housing apparatus 300 can be a high flow rate (e.g., greater than about 100 sccm). For example, flow distribution 900 along interior surface 229 of optical window 228 can provide a short residence (dwelling) time for any metal fluoride dusting 208 near interior surface 229.

Exemplary Flow Diagram

Figure 10:
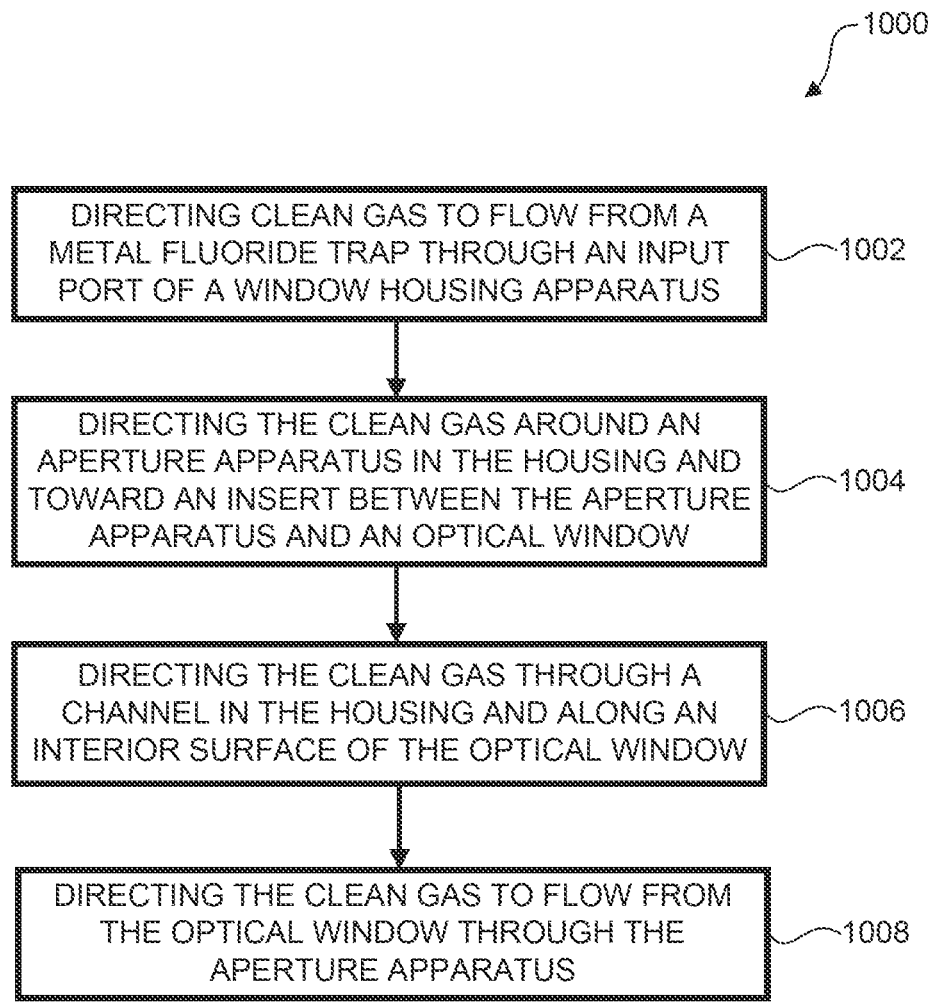
FIG. 10 illustrates a flow diagram for reducing metal fluoride dusting, according to an exemplary embodiment.

FIG. 10 illustrates flow diagram 1000 for reducing metal fluoride dusting 208 in window housing apparatus 300, according to an embodiment. It is to be appreciated that not all steps in FIG. 10 are needed to perform the disclosure provided herein. Further, some of the steps may be performed simultaneously, sequentially, and/or in a different order than shown in FIG. 10. Flow diagram 1000 shall be described with reference to FIGS. 2-9. However, flow diagram 1000 is not limited to those example embodiments.

In step 1002, as shown in the example of FIGS. 2, 3, and 9, clean gas (e.g., dust free) can be directed to flow from MFT 280 through input port 227 of window housing apparatus 300. For example, step 1002 can include first flow location 902 shown in FIG. 9. In some embodiments, step 1002 can include directing clean gas to flow through bore 226 of plug 225 disposed between input port 227 and output port 224 of MFT 280, and a diameter of bore 226 can be configured to control a flow rate of clean gas into window housing apparatus 300.

In step 1004, as shown in the example of FIGS. 2-9, clean gas (e.g., dust free) can be directed to flow around aperture apparatus 500 in window housing 400 of window housing apparatus 300 and toward insert 700 disposed between aperture apparatus 500 and optical window 228. For example, step 1004 can include second and third flow locations 904, 906 shown in FIG. 9. In some embodiments, step 1004 can include directing clean gas to flow through tangs 522, 524, 526, 528 disposed on second exterior surface 514 of aperture apparatus 500. In some embodiments, step 1004 can further include directing clean gas to flow through insert channel 722 in insert 700'.

In step 1006, as shown in the example of FIGS. 2-9, clean gas (e.g., dust free) can be directed to flow through housing channel 412 and housing port 410 of window housing 400 and along interior surface 229 of optical window 228. For example, step 1006 can include fourth and fifth flow locations 908, 910 shown in FIG. 9. In some embodiments, step 1006 can include directing clean gas to flow from housing channel 412 and housing port 410 along the entire interior surface 229 of optical window 228.

In step 1008, as shown in the example of FIGS. 2-9, clean gas (e.g., dust free) can be directed to flow from optical window 228 through aperture apparatus 500. For example, step 1008 can include sixth flow location 912 shown in FIG. 9. In some embodiments, step 1008 can include directing clean gas to flow from interior surface 229 of optical window 228 toward aperture apparatus 500 and through cells 548, 558, 568, 578, 588 having a decreasing diameter from front end 504 to back end 502 of aperture apparatus 500.

Although specific reference can be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, LCDs, thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track unit (a tool that typically applies a layer of resist to a substrate and develops the exposed resist), a metrology unit and/or an inspection unit. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments in the context of optical lithography, it will be appreciated that embodiments may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

It is to be understood that the phraseology or terminology herein is for the purpose of description and not of limitation, such that the terminology or phraseology of the present specification is to be interpreted by those skilled in relevant art(s) in light of the teachings herein.

The term "substrate" as used herein describes a material onto which material layers are added. In some embodiments, the substrate itself may be patterned and materials added on top of it may also be patterned, or may remain without patterning.

The following examples are illustrative, but not limiting, of the embodiments of this disclosure. Other suitable modifications and adaptations of the variety of conditions and parameters normally encountered in the field, and which would be apparent to those skilled in the relevant art(s), are within the spirit and scope of the disclosure.

Although specific reference may be made in this text to the use of the apparatus and/or system in the manufacture of ICs, it should be explicitly understood that such an apparatus and/or system has many other possible applications. For example, it can be employed in the manufacture of integrated optical systems, guidance and detection patterns for magnetic domain memories, LCD panels, thin-film magnetic heads, etc. The skilled artisan will appreciate that, in the context of such alternative applications, any use of the terms "reticle," "wafer," or "die" in this text should be considered as being replaced by the more general terms "mask," "substrate," and "target portion," respectively.

While specific embodiments have been described above, it will be appreciated that the embodiments may be practiced otherwise than as described. The description is not intended to limit the scope of the claims.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein.

Other aspects of the invention are set out in the following numbered clauses.

1. A light source apparatus comprising:
   a chamber configured to hold a gas discharge medium, the gas discharge medium outputting a light beam;
   a metal fluoride trap coupled to the chamber and configured to trap metal fluoride dust generated from the chamber and provide clean gas along an output port; and
   a set of window housing apparatuses coupled to the chamber and configured to reduce metal fluoride dusting on optical windows, wherein each window housing apparatus comprises:
   a window housing supporting an optical window;
   an aperture apparatus coupled to the window housing and comprising a plurality of cells configured to trap metal fluoride dust flowing upstream from the chamber through the aperture apparatus toward the optical window; and
   an insert disposed between the aperture apparatus and the optical window, wherein the insert is configured to control a first flow rate of the clean gas along the optical window and a second flow rate of the clean gas through the aperture apparatus.

2. The light source apparatus of clause 1, wherein the insert is configured such that the first flow rate along the optical window is greater than or equal to the second flow rate through the aperture apparatus.

3. The light source apparatus of clause 1, wherein the insert comprises a channel configured to decrease the first flow rate along the optical window and increase the second flow rate through the aperture apparatus.

4. The light source apparatus of clause 3, wherein a cross-sectional area of the channel is proportional to the first flow rate decrease and the second flow rate increase.

5. The light source apparatus of clause 1, wherein the window housing apparatus further comprises a plug with a bore disposed between an input port of the window housing and the output port of the metal fluoride trap.

6. The light source apparatus of clause 5, wherein the plug and output port are disposed in a frame of the chamber.

7. The light source apparatus of clause 1, wherein a plurality of tangs are disposed on an exterior surface of the aperture apparatus and are configured to direct the clean gas to flow around the aperture apparatus toward the insert, wherein the plurality of tangs comprise an outer diameter greater than the exterior surface of the aperture apparatus to provide a gap for the clean gas to flow through.

8. The light source apparatus of clause 1, wherein the window housing comprises a channel configured to flush the clean gas along the optical window.

9. The light source apparatus of clause 1, wherein the window housing comprises a Fresnel beam capture pocket configured to capture and absorb Fresnel reflections from the optical window to achieve a desired reflection-transmission ratio for the optical window.

10. The light source apparatus of clause 1, wherein the gas discharge medium comprises an excimer and/or an exciplex.

11. The light source apparatus of clause 10, wherein the gas discharge medium comprises $F_2$, ArF, KrF, and/or XeF.

12. The light source apparatus of clause 1, further comprising a set of optical elements configured to form an optical resonator around the chamber.

13. The light source apparatus of clause 12, wherein the set of optical elements comprises:
   an optical coupler in optical communication with a first window housing apparatus; and a linewidth narrowing module in optical communication with a second window housing apparatus.

14. The light source apparatus of clause 12, wherein the set of optical elements comprises:
- a wavefront engineering box in optical communication with a first window housing apparatus; and
- a beam reverser in optical communication with a second window housing apparatus.

15. The light source apparatus of clause 1, wherein the insert is configured such that the first flow rate of the clean gas along the optical window is configured to reduce a thermal boundary layer along an interior surface of the optical window.

16. A window housing apparatus configured to reduce metal fluoride dusting on an optical window, the window housing apparatus comprising:
- a window housing supporting the optical window;
- an aperture apparatus coupled to the window housing and comprising a plurality of cells configured to trap metal fluoride dust flowing through the aperture apparatus toward the optical window; and
- an insert disposed between the aperture apparatus and the optical window,
- wherein the insert is configured to control a first flow rate of clean gas along the optical window and a second flow rate of the clean gas through the aperture apparatus.

17. The window housing apparatus of clause 16, wherein the window housing includes a bore therein configured to receive the aperture apparatus and the insert.

18. The window housing apparatus of clause 17, wherein the bore comprises an undercut and/or a recess configured to increase a volume of the clean gas in the window housing apparatus.

19. The window housing apparatus of clause 16, wherein the window housing comprises a channel configured to direct the clean gas to flow along the optical window prior to flowing through aperture apparatus.

20. The window housing apparatus of clause 16, wherein a plurality of tangs are disposed along an exterior surface of the aperture apparatus and are configured to direct the clean gas to flow around the aperture apparatus toward the insert, wherein the plurality of tangs are symmetrically arranged.

21. The window housing apparatus of clause 20, wherein the plurality of tangs of the aperture apparatus mechanically mate with a plurality of recesses in the insert.

22. The window housing apparatus of clause 16, wherein the aperture apparatus comprises a plurality of cells each configured to trap metal fluoride dust flowing upstream from the chamber through the aperture apparatus toward the optical window.

23. The window housing apparatus of clause 16, wherein the aperture apparatus comprises at least five cells having a decreasing diameter from a front end to a back end toward the chamber.

24. The window housing apparatus of clause 16, wherein the window housing apparatus is configured such that the first flow rate along the optical window is greater than or equal to the second flow rate through the aperture apparatus.

25. The window housing apparatus of clause 16, wherein the insert comprises a channel configured to decrease the first flow rate along the optical window and increase the second flow rate through the aperture apparatus.

26. The window housing apparatus of clause 25, wherein a cross-sectional area of the channel is proportional to the first flow rate decrease and the second flow rate increase.

27. A method of reducing metal fluoride dusting on an optical window in a window housing apparatus, the method comprising:
- directing clean gas to flow from a metal fluoride trap through an input port of the window housing apparatus;
- directing the clean gas to flow around an aperture apparatus disposed in a window housing of the window housing apparatus and toward an insert disposed between the aperture apparatus and the optical window;
- directing the clean gas to flow through a channel in the window housing and along an interior surface of the optical window; and
- directing the clean gas to flow from the optical window through the aperture apparatus.

28. The method of clause 27, wherein the directing clean gas to flow from the metal fluoride trap comprises directing the clean gas to flow through a bore of a plug disposed between the input port and an output port of the metal fluoride trap, wherein a diameter of the bore is configured to control a flow rate of the clean gas into the window housing apparatus.

29. The method of clause 27, wherein the directing the clean gas to flow around the aperture apparatus comprises directing the clean gas to flow through a plurality of tangs disposed on an exterior surface of the aperture apparatus.

30. The method of clause 27, wherein the directing the clean gas to flow around the aperture apparatus comprises directing the clean gas to flow through a channel in the insert.

31. The method of clause 27, wherein the directing the clean gas to flow through the channel comprises directing the clean gas to flow from the channel along the entire interior surface of the optical window.

32. The method of clause 27, wherein the directing the clean gas to flow from the optical window comprises directing the clean gas to flow from the interior surface of the optical window toward the aperture apparatus and through a plurality of cells having a decreasing diameter from a front end to a back end of the aperture apparatus.

33. The method of clause 27, wherein the optical window forms part of a chamber configured to hold a gas discharge medium that outputs a light beam and further comprising causing the gas discharge medium to produce a light beam.

The breadth and scope of the embodiments should not be limited by any of the above-described exemplary embodiments, but should be defined only in accordance with the following claims and their equivalents.

What is claimed is:

1. A light source apparatus comprising:
- a chamber configured to hold a gas discharge medium, the gas discharge medium outputting a light beam;
- a metal fluoride trap coupled to the chamber and configured to trap metal fluoride dust generated from the chamber and provide clean gas along an output port; and
- a set of window housing apparatuses coupled to the chamber and configured to reduce metal fluoride dusting on optical windows, wherein each window housing apparatus comprises:
  - a window housing supporting an optical window;
  - an aperture apparatus coupled to the window housing and comprising a plurality of cells configured to trap metal fluoride dust flowing upstream from the chamber through the aperture apparatus toward the optical window; and
  - an insert disposed between the aperture apparatus and the optical window, wherein the insert is configured to control a first flow rate of the clean gas along the optical window and a second flow rate of the clean gas through the aperture apparatus;

wherein the insert defines an insert port fluidly coupling a flow distribution around the aperture apparatus with a channel defined in the window housing.

2. A light source apparatus comprising:
a chamber configured to hold a gas discharge medium, the gas discharge medium outputting a light beam;
a metal fluoride trap coupled to the chamber and configured to trap metal fluoride dust generated from the chamber and provide clean gas along an output port; and
a set of window housing apparatuses coupled to the chamber and configured to reduce metal fluoride dusting on optical windows, wherein each window housing apparatus comprises:
a window housing supporting an optical window;
an aperture apparatus coupled to the window housing and comprising a plurality of cells configured to trap metal fluoride dust flowing upstream from the chamber through the aperture apparatus toward the optical window; and
an insert disposed between the aperture apparatus and the optical window, wherein the insert is configured to control a first flow rate of the clean gas along the optical window and a second flow rate of the clean gas through the aperture apparatus, wherein the insert is configured such that the first flow rate along the optical window is greater than or equal to the second flow rate through the aperture apparatus.

3. The light source apparatus of claim 1, wherein the insert comprises an insert aperture fluidly communicating with the plurality of cells of the aperture apparatus and an insert channel fluidly coupling the insert port with the insert aperture, the insert channel configured to decrease the first flow rate along the optical window and increase the second flow rate through the aperture apparatus.

4. The light source apparatus of claim 1, wherein the window housing apparatus further comprises a plug with a bore disposed between an input port of the window housing and the output port of the metal fluoride trap.

5. The light source apparatus of claim 1, wherein a plurality of tangs are disposed on an exterior surface of the aperture apparatus and are configured to direct the clean gas to flow around the aperture apparatus toward the insert port, wherein the plurality of tangs comprise an outer diameter greater than the exterior surface of the aperture apparatus to provide a gap for the clean gas to flow through.

6. The light source apparatus of claim 1, wherein the window housing comprises a Fresnel beam capture pocket configured to capture and absorb Fresnel reflections from the optical window to achieve a desired reflection-transmission ratio for the optical window.

7. The light source apparatus of claim 1, wherein the gas discharge medium comprises an excimer and/or an exciplex.

8. The light source apparatus of claim 1, further comprising a set of optical elements configured to form an optical resonator around the chamber.

9. A window housing apparatus configured to reduce metal fluoride dusting on an optical window, the window housing apparatus comprising:
a window housing supporting the optical window;
an aperture apparatus coupled to the window housing and comprising a plurality of cells configured to trap metal fluoride dust flowing through the aperture apparatus toward the optical window; and
an insert disposed between the aperture apparatus and the optical window, the insert defining an insert port fluidly coupling a flow distribution around the aperture apparatus with a channel defined in the window housing;
wherein the insert is configured to control a first flow rate of clean gas along the optical window and a second flow rate of the clean gas through the aperture apparatus.

10. The window housing apparatus of claim 9, wherein the window housing includes a bore therein configured to receive the aperture apparatus and the insert.

11. The window housing apparatus of claim 10, wherein the bore comprises an undercut and/or a recess configured to increase a volume of the clean gas in the window housing apparatus.

12. A window housing apparatus configured to reduce metal fluoride dusting on an optical window, the window housing apparatus comprising:
a window housing supporting the optical window;
an aperture apparatus coupled to the window housing and comprising a plurality of cells configured to trap metal fluoride dust flowing through the aperture apparatus toward the optical window; and
an insert disposed between the aperture apparatus and the optical window, the insert configured to control a first flow rate of clean gas along the optical window and a second flow rate of the clean gas through the aperture apparatus;
wherein a plurality of tangs are disposed along an exterior surface of the aperture apparatus and are configured to direct the clean gas to flow around the aperture apparatus toward the insert, wherein the plurality of tangs are symmetrically arranged.

13. The window housing apparatus of claim 12, wherein the plurality of tangs of the aperture apparatus mechanically mate with a plurality of recesses in the insert.

14. The window housing apparatus of claim 9, wherein the aperture apparatus comprises at least five cells having a decreasing diameter from a front end to a back end toward the chamber.

15. A window housing apparatus configured to reduce metal fluoride dusting on an optical window, the window housing apparatus comprising:
a window housing supporting the optical window;
an aperture apparatus coupled to the window housing and comprising a plurality of cells configured to trap metal fluoride dust flowing through the aperture apparatus toward the optical window; and
an insert disposed between the aperture apparatus and the optical window, the insert configured to control a first flow rate of clean gas along the optical window and a second flow rate of the clean gas through the aperture apparatus;
wherein the window housing apparatus is configured such that the first flow rate along the optical window is greater than or equal to the second flow rate through the aperture apparatus.

16. The window housing apparatus of claim 9, wherein the insert comprises an insert aperture fluidly communicating with the plurality of cells of the aperture apparatus and an insert channel fluidly coupling the insert port with the insert aperture, the insert channel configured to decrease the first flow rate along the optical window and increase the second flow rate through the aperture apparatus.

17. A method of reducing metal fluoride dusting on an optical window in a window housing apparatus, the method comprising:

directing clean gas to flow along a first flow distribution from a metal fluoride trap through an input port of the window housing apparatus, around an aperture apparatus disposed in a window housing of the window housing apparatus, through an insert port defined at an exterior of an insert that is disposed between the aperture apparatus and the optical window, through a channel defined in the window housing, toward the optical window, and along an interior surface of the optical window; and directing the clean gas to flow along a second flow distribution from the optical window through an insert aperture of the insert and through an interior of the aperture apparatus.

18. The method of claim 17, wherein the directing the clean gas to flow around the aperture apparatus comprises directing the clean gas to flow through a plurality of tangs disposed on an exterior surface of the aperture apparatus.

19. A method of reducing metal fluoride dusting on an optical window in a window housing apparatus, the method comprising:

directing clean gas to flow from a metal fluoride trap through an input port of the window housing apparatus;

directing the clean gas to flow around an aperture apparatus disposed in a window housing of the window housing apparatus and toward an insert disposed between the aperture apparatus and the optical window;

directing the clean gas to flow through a channel in the window housing and along an interior surface of the optical window; and directing the clean gas to flow from the optical window through the aperture apparatus, wherein the directing the clean gas to flow around the aperture apparatus comprises directing the clean gas to flow through an insert channel in the insert.

20. The method of claim 17, wherein the directing the clean gas to flow from the optical window comprises directing the clean gas to flow from the interior surface of the optical window toward the aperture apparatus and through a plurality of cells having a decreasing diameter from a front end to a back end of the aperture apparatus.

21. The light source apparatus of claim 1, wherein a first flow distribution is formed around the aperture apparatus, through the insert port, and toward the optical window, and a second flow distribution is formed within an insert aperture of the insert and an interior of the aperture apparatus away from the optical window.

* * * * *